(12) United States Patent
Rigdon et al.

(10) Patent No.: US 11,466,815 B2
(45) Date of Patent: Oct. 11, 2022

(54) HYDROGEN FUEL CANISTER

(71) Applicant: Black & Decker Inc., Newark, DE (US)

(72) Inventors: William Rigdon, Baltimore, MD (US); Daniel J. White, Middle River, MD (US); Gary Hill, Red Lion, PA (US); Anthony Romano, Crofton, MD (US); Derek Marchanti, Nottingham, MD (US); Matthew J. Velderman, Jr., Baltimore, MD (US); Andrew Seman, Pylesville, MD (US)

(73) Assignee: BLACK & DECKER INC., Newark, DE (US)

(*) Notice: Subject to any disclaimer, the term of this patent is extended or adjusted under 35 U.S.C. 154(b) by 250 days.

(21) Appl. No.: 16/153,657

(22) Filed: Oct. 5, 2018

(65) Prior Publication Data

US 2019/0107254 A1 Apr. 11, 2019

Related U.S. Application Data

(60) Provisional application No. 62/569,222, filed on Oct. 6, 2017.

(51) Int. Cl.
*B25C 1/08* (2006.01)
*F17C 13/04* (2006.01)
*F17C 11/00* (2006.01)
*F17C 5/06* (2006.01)
*B25C 1/00* (2006.01)

(52) U.S. Cl.
CPC ............ *F17C 13/04* (2013.01); *B25C 1/08* (2013.01); *F17C 5/06* (2013.01); *F17C 11/005* (2013.01); *B25C 1/008* (2013.01); *F17C 2201/058* (2013.01); *F17C 2205/0326* (2013.01); *F17C 2221/012* (2013.01); *F17C 2270/0545* (2013.01); *F17C 2270/0763* (2013.01)

(58) Field of Classification Search
CPC ...................................... B25C 1/08; F17C 5/06
USPC .............................................................. 227/9
See application file for complete search history.

(56) References Cited

U.S. PATENT DOCUMENTS

| 3,313,459 A | 4/1967 | Mizuguchi |
| 4,403,722 A | 9/1983 | Nikolich |

(Continued)

FOREIGN PATENT DOCUMENTS

| GB | 2405744 A | 3/2005 |
| WO | 2006135896 A2 | 12/2006 |

OTHER PUBLICATIONS

International Search Report and Written Opinion for International Application No. PCT/US2018/054765, dated Jan. 8, 2019, 10 pages.

*Primary Examiner* — Michelle Lopez
(74) *Attorney, Agent, or Firm* — Brake Hughes Bellermann LLP

(57) ABSTRACT

A combustion powered tool uses a fuel canister with a refillable hydrogen storage vessel containing metal hydride. The fuel canister includes a valve assembly with at least one valve to release hydrogen fuel gas. The valve assembly is removable from the refillable hydrogen storage vessel. A coupling device includes a first coupler attached to the refillable hydrogen storage vessel and a second coupler attached to the valve assembly. An outlet adapter is attached to the valve assembly to supply hydrogen fuel gas to the power tool.

29 Claims, 12 Drawing Sheets

(56) References Cited

U.S. PATENT DOCUMENTS

| | | |
|---|---|---|
| 4,427,137 A | 1/1984 | Dubini |
| 4,483,474 A | 11/1984 | Nikolich |
| 4,522,162 A | 6/1985 | Nikolich |
| 5,169,038 A | 12/1992 | Di Giovanni |
| 5,842,623 A * | 12/1998 | Dippold .................. B25C 1/163 89/1.14 |
| 5,976,725 A | 11/1999 | Gamo et al. |
| 6,268,077 B1 | 7/2001 | Kelley et al. |
| 6,506,511 B1 | 1/2003 | Cruickshank et al. |
| 6,523,860 B1 * | 2/2003 | Shkolnikov .............. B25C 1/08 227/10 |
| 7,044,090 B2 | 5/2006 | Ohtsu et al. |
| 7,168,603 B1 * | 1/2007 | Lund ..................... B25C 1/08 227/129 |
| 7,234,464 B2 | 6/2007 | Goede et al. |
| 7,261,071 B2 | 8/2007 | Ohtsu et al. |
| 8,015,630 B2 | 9/2011 | Kihs |
| 8,205,777 B2 | 6/2012 | Nishikawa et al. |
| 8,302,217 B2 | 11/2012 | Kihs |
| 8,302,831 B2 | 11/2012 | Taylor et al. |
| 8,347,832 B2 | 1/2013 | Adams |
| 8,375,940 B2 | 2/2013 | Goede et al. |
| 8,505,896 B2 | 8/2013 | Kitaura et al. |
| 8,511,264 B2 | 8/2013 | Adams |
| 8,597,844 B2 | 12/2013 | McLean et al. |
| 8,820,321 B2 | 9/2014 | Goede et al. |
| 8,893,670 B2 | 11/2014 | Kosuge et al. |
| 8,925,517 B2 | 1/2015 | Adams |
| 8,939,339 B2 | 1/2015 | Vanstaan et al. |
| 8,973,746 B2 * | 3/2015 | Chung .................. F17C 1/12 206/0.6 |
| 8,978,950 B2 | 3/2015 | Yamamoto et al. |
| 8,985,425 B2 | 3/2015 | Osuga et al. |
| 9,027,799 B2 | 5/2015 | Hanai et al. |
| 9,188,132 B1 | 11/2015 | Tom |
| 9,370,859 B2 | 6/2016 | Kosuge et al. |
| 9,381,636 B2 | 7/2016 | Aihara et al. |
| 10,717,180 B2 * | 7/2020 | Fan ......................... B25C 1/08 |
| 2003/0041899 A1 | 3/2003 | Frank |
| 2004/0009379 A1 | 1/2004 | Amendola et al. |
| 2007/0084523 A1 | 4/2007 | McLean et al. |
| 2008/0217372 A1 | 9/2008 | Webb |
| 2008/0286621 A1 | 11/2008 | Rosenzweig et al. |
| 2010/0104481 A1 | 4/2010 | Curello et al. |
| 2012/0160711 A1 * | 6/2012 | Yang .................. F17C 11/005 206/0.6 |
| 2016/0059398 A1 | 3/2016 | Wong et al. |
| 2016/0059399 A1 | 3/2016 | Wong et al. |
| 2016/0087294 A1 | 3/2016 | Rosenzweig et al. |
| 2016/0216715 A1 | 7/2016 | Lapena-Rey et al. |

\* cited by examiner

HYDROGEN FUEL CANISTER

RELATED APPLICATION

This application claims priority to and the benefit of U.S. Provisional Application No. 62/569,222, filed Oct. 6, 2017, entitled, "Hydrogen Fuel Canister", which is incorporated herein by reference in its entirety.

TECHNICAL FIELD

This description relates, generally, to a fuel canister, and in particular, to a hydrogen fuel canister for a handheld power tool.

BACKGROUND

Power may be supplied to power tools by, for example, an electrical power source supplying power to the tool through a cord, a hydraulic power supply (e.g., compressed air) supplying compressed air to the tool through a hose, a battery supplying stored electrical power to the tool, and the like. Power tools driven by electrical power and/or compressed air may operate as long as a source of power is available. However, the use of power tools driven by electrical power and/or compressed air may, in some circumstances, be cumbersome due to the attachment of the tool to the cord and/or the hose supplying power to the tool, and/or may be limited by the availability of source of electrical power and/or compressed air. Additionally, the cord and/or hose may limit the range that the power tool may move and might become entangled during operation. Thus, use of these types of corded tools may be inconvenient when compared to a cordless tool providing nearly the same capability. For example, use of a battery to supply power to the power tool may eliminate the need for a cord or hose attachment of the tool to the power source. However, tools driven by power supplied by a battery may have a relatively limited operating period within the life of the battery, and may be relatively heavy and less nimble. Cordless, combustion powered tools may provide a favorable alternative to corded and/or battery power tools, due to combination of power, runtime, and lightweight ergonomics.

SUMMARY

In one general aspect, a fuel canister for use with a combustion power tool may include a refillable hydrogen storage vessel containing metal hydride, a valve assembly including at least one valve to release hydrogen fuel gas, the valve assembly being removably coupled to the hydrogen storage vessel, a coupling device, the coupling device including a first coupler attached to the refillable hydrogen storage vessel and a second coupler attached to the valve assembly, and an outlet attached to the valve assembly to supply hydrogen fuel gas to the power tool.

In another general aspect, a refillable fuel canister system for use with a combustion power tool including a fuel canister is disclosed. The fuel canister may include a housing, a refillable hydrogen storage vessel disposed inside of the housing, the refillable hydrogen storage vessel containing metal hydride, and a valve assembly configured to release hydrogen fuel gas, and a filling station to provide a source of compressed hydrogen. The valve assembly may be removably coupled to the refillable hydrogen storage vessel.

In another general aspect, a combustion powered fastening tool including a housing, a driving system included in the housing, and a fuel delivery system included in the housing is disclosed. The driving system may be configured to exert a driving force on a fastener in response to combustion of fuel delivered to the driving system by the fuel delivery system. The fuel delivery system may include a fuel canister. The fuel canister may include a housing including a first end portion and a second end portion, a refillable hydrogen storage vessel disposed inside of the housing, the refillable hydrogen storage vessel containing metal hydride, a valve assembly configured to release hydrogen fuel gas, the valve assembly being removably coupled to the refillable hydrogen storage vessel, and an outlet adapter attached to the first end portion to supply hydrogen fuel gas to the driving system.

The details of one or more implementations are set forth in the accompanying drawings and the description below. Other features will be apparent from the description and drawings.

DETAILED DESCRIPTION

Figure 1A:
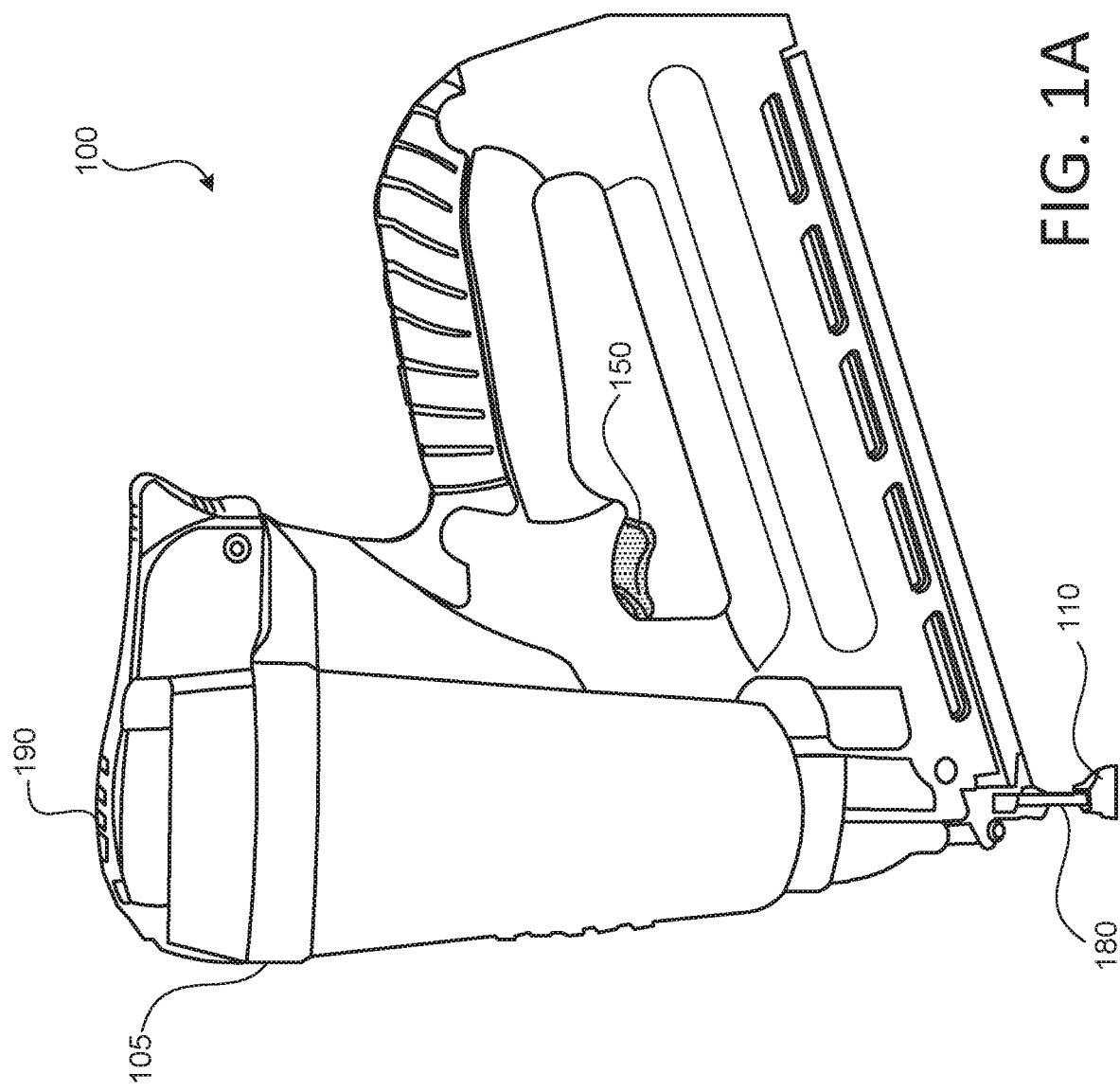
FIG. 1A is a perspective view of a combustion-power tool in accordance with an example embodiment.

Combustion powered tools may require fuel canisters that may be for a single use. These are also referred to as fuel cells in the industry. The consumable fuel canisters that store and control release of energy to the tool may be purchased and can be refillable.

The combustion powered tool may be driven by the combustion of fuel, for example, a fuel canister, received in a housing of the tool and/or coupled to the housing of the tool. Chemicals, such as, for example, butane, propane, hydrogen, etc., may be used as the fuel. In the combustion powered tool, a valve assembly, in accordance with implementations described herein, may dispense a previously defined amount, or volume, of fuel from a fuel canister into a combustion chamber of the tool. The previously defined amount or volume, which may be determined by an internal geometry of a control space of the valve assembly, may provide for optimal fuel ratio delivered and subsequent combustion to generate a required driving force for successful operation of the tool. The defined amount of fuel may also be measured or metered by opening a valve, such as a solenoid valve, for a controlled period of time. Other implementations may include alternative metering, or measuring, of the fuel supplied to the combustion chamber by the valve assembly, to provide a defined amount, or volume, of fuel for optimum combustion. In some implementations, fuel pressure may be regulated (between vessel and valve) so a consistent amount is determined by a pressure-volume relationship.

A valve assembly, including a fuel delivery valve, or a fuel metering valve, attached to a fuel canister, in accordance with implementations described herein, may provide for a controlled volume release of fuel, such as, for example, hydrogen. This controlled volume release of fuel for combustion may ensure the generation of a required amount of driving force or torque for desired operation of the tool.

Using hydrogen as a fuel may have benefits over other fuels. For example, hydrogen is a clean fuel that limits emission of toxic or otherwise undesirable combustion byproducts (e.g., carbon dioxide, carbon monoxide, $SO_x$, and/or $NO_x$). Hydrogen fuel is considered environmentally friendly and may also be more favorable for use indoors. Hydrogen is a promising energy generation technology that offers convenience and can be generated on-demand directly from de-ionized water via electrolysis (i.e., it can be plugged in to electric outlet). Hydrogen fuel can also be stored at relatively low pressures with high volumetric density if absorbed in metallic elements, for instance.

One known method of storing hydrogen is to use a metal hydride. More specifically, the hydrogen gas is usually filled in a pressurized gas storage canister with metal hydride, so that the hydrogen gas is adsorbed and stored by the metal hydride. The absorption of hydrogen within the metal hydride is reversible and is a function of pressure and temperature. Metal hydrides provide an attractive reservoir for hydrogen, because the hydrogen density in metal hydrides can be even greater than that for gaseous or liquid hydrogen, and the hydrogen can be stored at relatively low pressures and at moderate filling temperatures. In using hydrogen, the gas storage canister should be capable of absorbing heat from the environment in order for effective release of hydrogen gas to a device (e.g., power tool). In filling metal hydrides, the gas storage canister should be capable of desorbing heat to the environment to effectively minimize filling time. The use of metal hydrides includes good storage properties in various environmental conditions and high volumetric and/or gravimetric storage capacity.

Figure 1B:
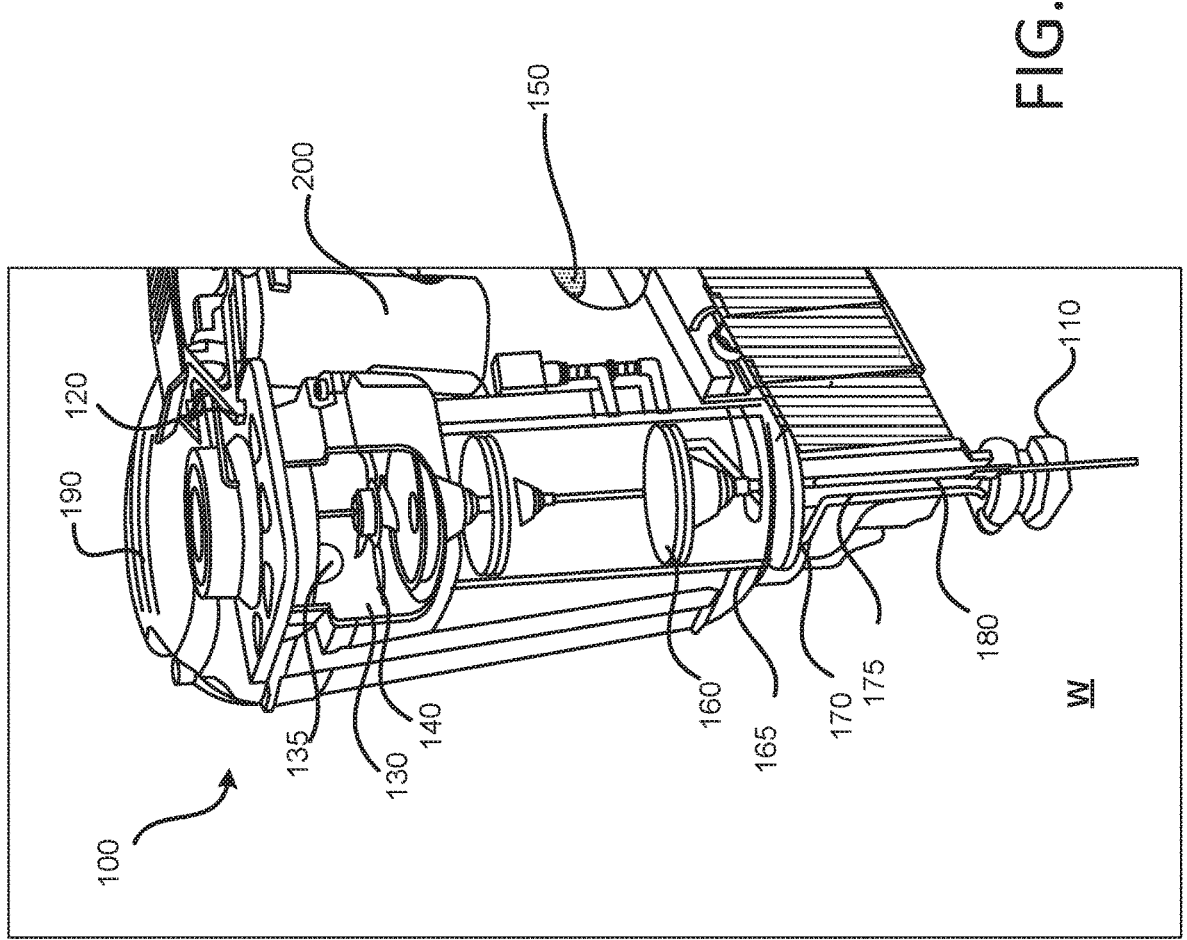
FIG. 1B is cutaway perspective view of the combustion-power tool shown in FIG. 1A.

FIGS. 1A and 1B are perspective views of a combustion-powered tool in accordance with implementations described herein using hydrogen fuel as a power source. While FIGS. 1A and 1B illustrate a handheld fastening tool 100, and in particular, a nailing tool, the principles to be described herein may be applied to other types of combustion powered tools, such as, for example, other types of fastening tools, including, for example, riveting tools, stapling tools, and the like. The principles to be described herein may be applied to other types of tools, in addition to fastening tools, such as, for example, impact tools, demolition tools, crimping tools, and the like.

Figure 2:
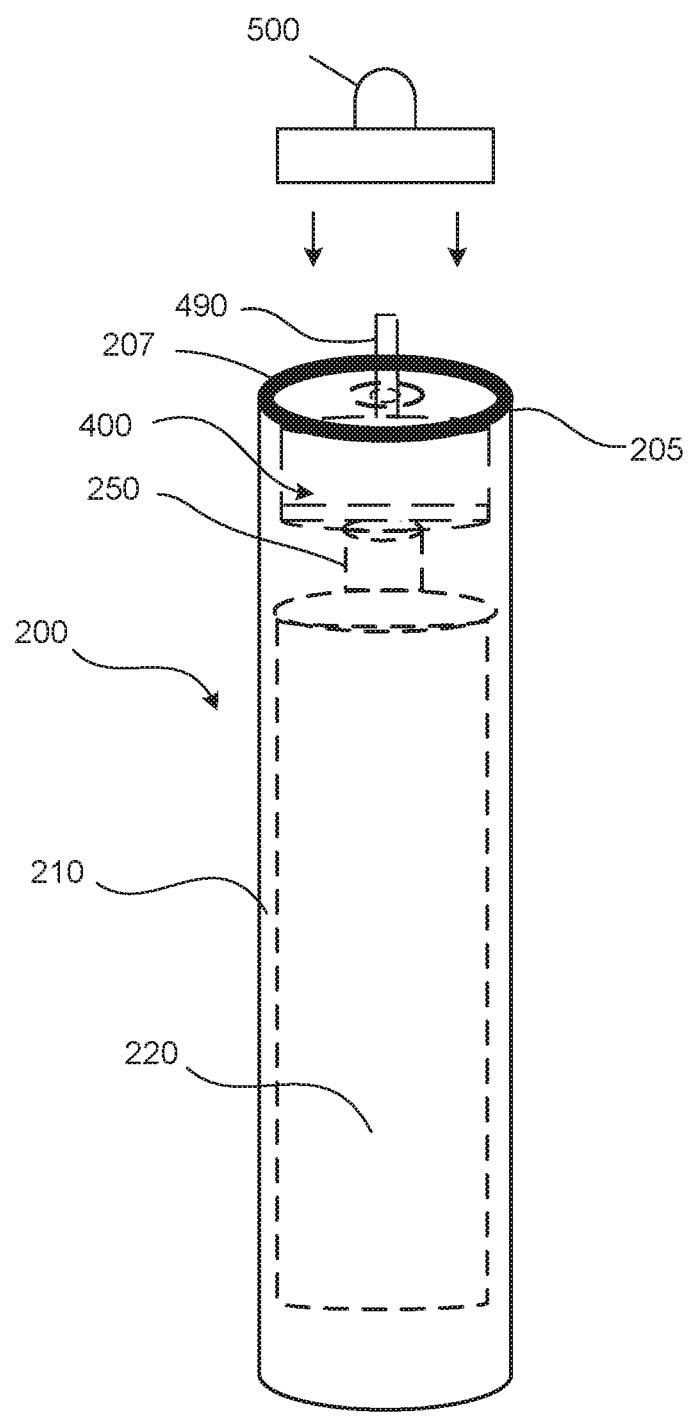
FIG. 2 is a schematic diagram of an example fuel canister according to example embodiments.

The example fastening tool 100 shown in FIGS. 1A and 1B includes a housing 105, and a driving system configured to drive a fastener into a workpiece W. The driving system operates in response to fuel delivered to the driving system by a fuel delivery system, and combustion of the fuel by the driving system. A plurality of fasteners 180 may be arranged in a magazine received in the housing 105. The driving system of the tool 100 may drive a fastener 180 into the workpiece W in response to actuation of a trigger 150 of the tool 100. In operation, a nose 110 of the example fastening tool 100 may be positioned against the workpiece W, for example, at a position on the workpiece W corresponding to intended placement of a fastener 180. Compression of the nose 110 against the workpiece W may cause closure of a combustion chamber 130, and may cause an actuator 120 to dispense fuel (e.g., hydrogen) from a fuel canister 200 into the combustion chamber 130. The fuel may be dispensed from the canister 200 via desorption from the metal hydride to a valve assembly 400, as shown in FIG. 2 then through an interface or outlet adapter 500 and finally diffuse into the combustion chamber 130, where rotation of a fan 140 may mix the fuel with oxygen. In this state, actuation of the trigger 150 may transmit an electronic pulse to a spark plug 135, igniting the fuel-air mixture in the combustion chamber 130. Reaction of the fuel-air mixture in the combustion chamber 130 may drive movement of a piston 160 (in a downward direction in the orientation illustrated in FIGS. 1A and 1B) within a cylinder 165. The downward movement of the piston 160 may in turn drive a driver blade 170, attached to a bottom portion of the piston 160, toward a fastener 180 (of the plurality of fasteners 180) received in a channel 175, positioned at the end of the driver blade 170. The movement of the driver blade 170 into the channel 175 (in response to the corresponding movement of the piston 160) may drive the fastener 180 out of the channel 175 and into the workpiece W. At the end of the piston stroke, a discharge of exhaust through an exhaust port 190 helps relieve pressure from the piston 160. Removal of pressure from the nose 110 (by, for example, movement of the tool 100 away from the surface of the workpiece W) may allow the combustion chamber 130 to be opened and pressure to be released. This release of pressure and subsequent cooling of the remaining gas may cause a thermal vacuum and retracting movement of the piston 160 in the cylinder 165, and corresponding return movement of the driver blade 170 out of the channel 175. Another fastener 180, of the plurality of fasteners 180, may then be released or moved into the channel 175 for the next drive movement of the piston.

An example fuel canister 200 is shown in FIG. 2. For ease of discussion and illustration, the orientation shown in FIG. 2 will be referred to as an upright orientation or an upright position. The fuel canister 200 may include a cylindrical outer housing (or shell) 210 housing a fuel (e.g., hydrogen) storage vessel 220, a valve assembly 400, and an adapter 250 to connect the fuel storage vessel 220 and the valve assembly 400. The housing 210 defines an open upper end 205 enclosed by a closure 207 which is sealingly secured to the housing 210. The housing 210 may be conventionally made from metal, such as, but not limited to, aluminum, steel, etc. In some implementations, the housing 210 may be made from a metal alloy. For example, the housing 210 may be made from an aluminum alloy which has excellent heat conductivity properties that can facilitate heat conduction during both gas absorption during filling and gas desorption during the release processes.

In some implementations, the housing 210 may not be present and the fuel storage vessel 220 may be directly connected to the tool 100. In this configuration, at one end of the fuel storage vessel 220, the adapter 250 can be directly connected to the tool 100. In some implementations, an outlet may be included or be designed for an outlet adapter to interface specifically with the tool 100.

The fuel storage vessel 220 (or hydrogen storage vessel) has a cylindrical form and can contain a metal alloy (e.g., metal hydride) that allows hydrogen to be stored in a solid-state, as part of the metal alloy matrix inside the storage vessel 220. In contrast with ordinary compressed hydrogen tanks, the pressure inside the fuel storage vessel 220 is very low for similar fuel storage volumes, making it safer and more practical for storing hydrogen. In other words, hydrogen is safely stored in the fuel storage vessel 220 with less expensive materials, thinner walls, and reduced risk of bursting. In some implementations, the fuel storage vessel 220 can be refillable. For example, once hydrogen is depleted from the fuel storage vessel 220, the metallic powder remains in the fuel storage vessel 220, although hydrogen fuel is released as gas. The metals may be rehydridized as a way to recharge the fuel canister 200 for future use. To this end, the fuel storage vessel 220 may be releasably disconnected from the fuel canister 200 so that that the fuel storage vessel 220 may be removed and refueled with hydrogen. In some implementations, the fuel storage vessel 220 can be refilled from a refilling station, such as, for example, a pressurized gas bottle or from a water-electrolysis based device (e.g., hydrogen refueling station), which may be non-toxic and/or eco-friendly. In some implementations, in use, the fuel storage vessel 220 may store at least 10 standard liters of hydrogen as part of a solid metal complex and with very little pressure.

In some implementations, a heat source (not shown) may be utilized to heat the fuel storage vessel 220. Alternatively, waste heat from combustion can be directed towards the fuel storage vessel 220. The heat can assist in obtaining a consistent and/or stable output of hydrogen pressure during repeated use. In some implementations, a cooling source (not shown) may be included to cool the fuel storage vessel 220 to expedite the filling process. For example, a cooling source may be a fan or a water bath attached to the fuel storage vessel 220.

In some implementations, the valve assembly 400 may be inside of the fuel canister 200. In one implementation, the valve assembly 400 may include a metering valve. The valve assembly 400 may deliver fuel from the fuel storage vessel 220 to an outlet adapter 500 to interface with the tool 100 and discharge fuel into the combustion chamber 130. The outlet adapter 500 may be coupled to the valve assembly 400 to assist discharge of fuel upon actuation. For example, the outlet adapter 500 may be threaded into the valve assembly 400 or fastened (e.g., snap-fit or twist-lock) to the open upper end 205 of the housing 210. The outlet adapter 500 may correspondingly engage with an outlet valve stem 490 of the valve assembly 400.

In some implementations, the valve assembly 400 may include a check valve (not shown) to prevent back pressure effects from combustion as well as other contaminants (e.g., water or oxygen) from entering the hydrogen storage vessel 220. In some implementations, the check valve may be disposed after (e.g., downstream of) the valve assembly 400, while in other implementations, the check valve may be disposed before (e.g., upstream of) the valve assembly 400.

Figure 3:
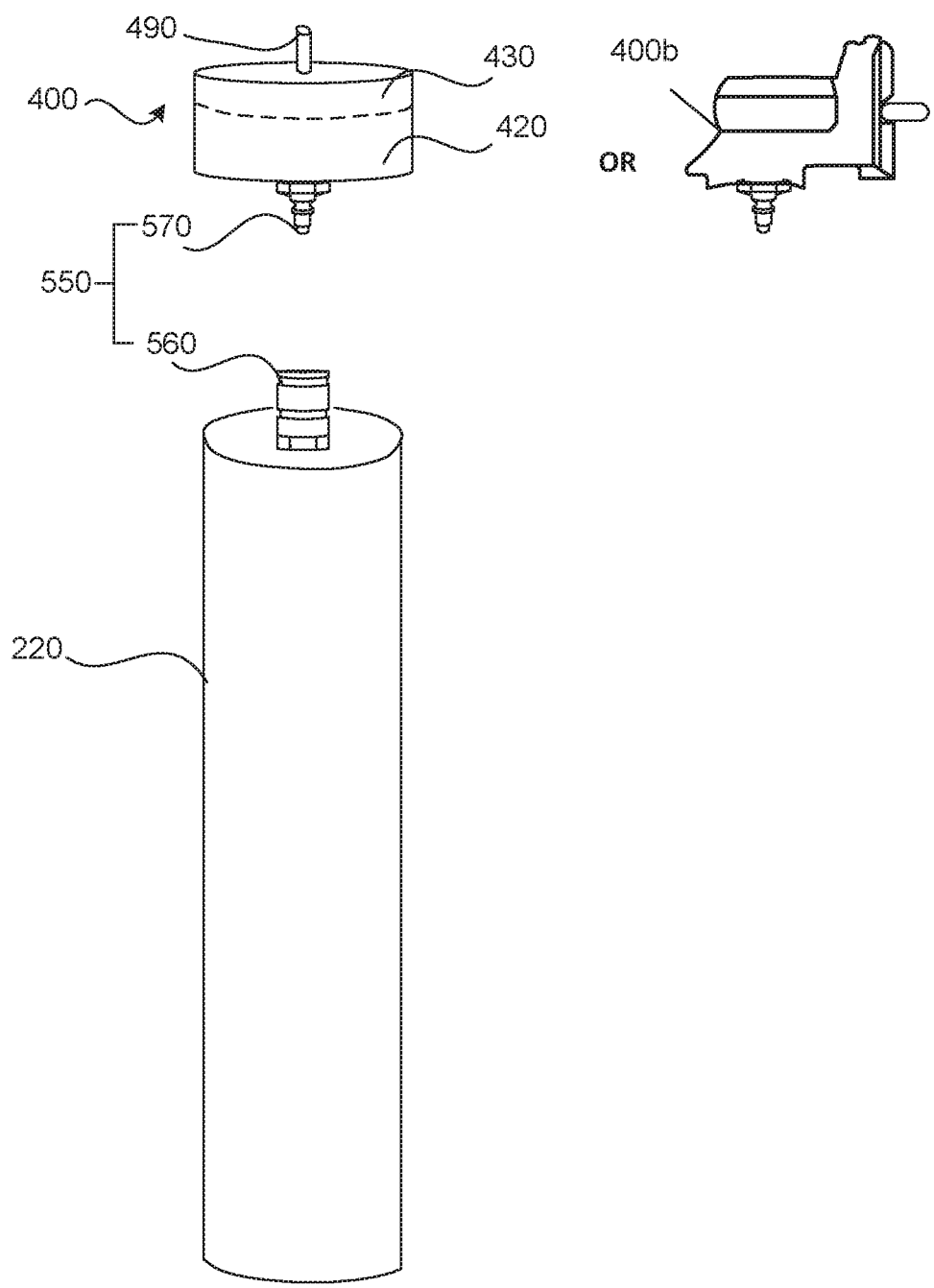
FIG. 3 illustrates a valve assembly coupled to an example fuel storage vessel according to example embodiments.

Referring to FIG. 3, the valve assembly 400 may be coupled (e.g., attached, fixed, joined, etc.) to the fuel storage vessel 220, and decoupled (e.g., unattached, separated, etc.) from the fuel storage vessel 220, by a coupling device 550. The coupling device 550 may include a first coupler 560 attached to the fuel storage vessel 220, and a second coupler 570 attached to the valve assembly 400. One of the first coupler 560 or the second coupler 570 may be a quick disconnect male coupler providing for snap fit, twist lock, or other similar type attachment, and the other of the first coupler 560 or the second coupler 570 may be a corresponding or mating quick disconnect female coupler. In an exemplary implementation described herein, the first coupler 560 may be a female fitting and the second coupler 570 may be a male fitting to provide quick disconnect.

In some implementations, the first coupler 560 may include a spring-loaded or similar shut-off style valve that is depressed by mating the second coupler 570 to open the flow of fuel. In the example arrangement shown in FIG. 3, the second coupler 570 can be a quick disconnect male coupler, and the first coupler 560 can be a quick disconnect female coupler, simply for ease of discussion and illustration. In some implementations, the coupling device 550 may be set with automatic locking and push-button release to allow for rapid engagement or disengagement between the first coupler 560 and the second coupler 570. In other words, the coupling device 550 provides for rapid connection and disconnection of the valve assembly 400 and the fuel storage vessel 220 via insertion of the second coupler 570 into the first coupler 560. This may also allow for rapid engagement/disengagement of the second coupler 570 to/from the first coupler 560, and rapid connect/disconnect of the valve assembly 400 from the fuel storage vessel 220, by removing the second coupler 570 from the first coupler 560.

An internal structure of the first coupler 560 and the second coupler 570 may allow for the flow of fuel from the fuel canister 200 into the valve assembly 400 only when the first and second couplers 560, 570 are engaged. The first coupler 560 coupled to the fuel storage vessel 220 may include a shutoff mechanism that blocks the flow of fuel out of the fuel canister 200 through the first coupler 560 when the first and second couplers 560, 570 are disengaged. In some implementations, the valve assembly 400 may be axially aligned with the first and second couplers 560, 570 and the fuel storage vessel 220, so as to dispense fuel in an axial direction from the valve assembly 400, as illustrated by the arrow pointing the opposite direction of F1 in FIG. 5B.

In some implementations, the fuel storage vessel 220 may be directly connected to the tool 100 for discharging fuel into the combustion chamber 130 of the tool 100. In this exemplary embodiment, there is no outer housing 210 of the fuel canister 200 to house the fuel storage vessel 220. In some implementations, as shown in FIG. 3, an alternative radial metering valve 400b may be used (engaged directly to the fuel storage vessel 220) instead of the axial valve assembly 400 to interface with alternative tools, such as those requiring a metering valve with delivery of fuel required in radial direction such as that shown in FIG. 3.

Figure 4:
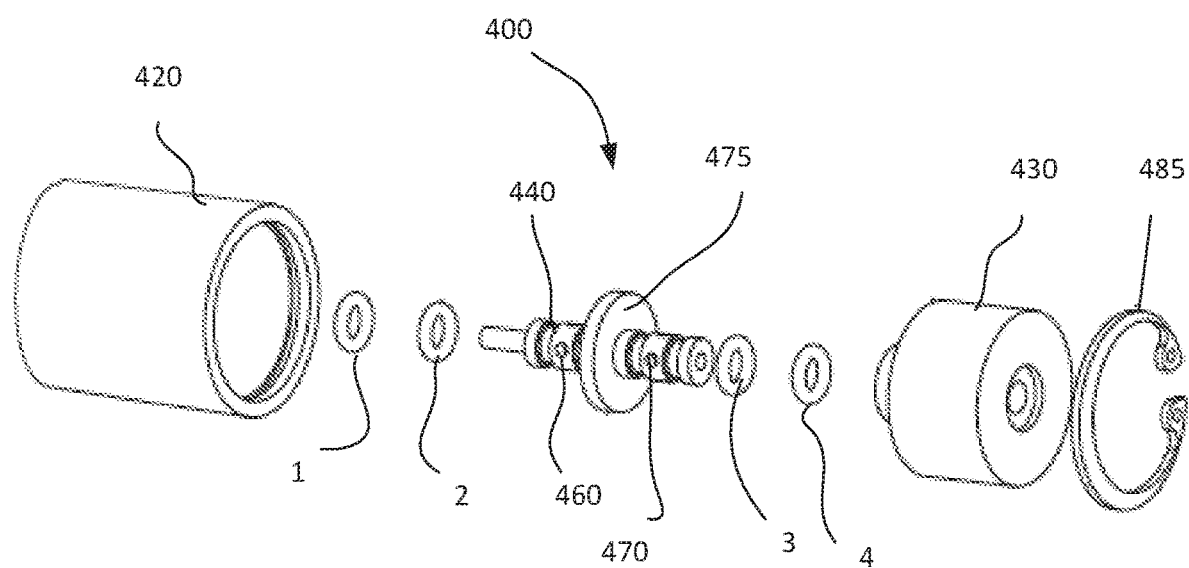
FIG. 4 illustrates an exploded view of the valve assembly of FIG. 3.

FIG. 4 is an example of an exploded perspective view of the valve assembly 400 shown in FIG. 3. As shown in FIG. 4, the valve assembly 400 may include a valve cap 430 coupled to a main valve body 420. A shuttle 440 (or piston), may be received within a chamber 450 (as shown in FIGS. 5A-5D) defined within the valve main body 420/valve cap 430. In the illustrative exemplary embodiments described herein, a first portion of the cylindrical chamber 450 is defined by a recess, or bore in the main valve body 420, and a second portion of the cylindrical chamber 450 is defined by a recess, or a bore in the valve cap 430. With the valve cap 430 installed on the main valve body 420, the first portion and the second portion are axially aligned to define the cylindrical chamber 450 in the valve assembly 400. A retaining ring 485 may be provided to hold the main valve body 420 and the valve cap 430 together, though other possibilities also exist for this purpose. A plurality of seals, or dynamic sealing surfaces, such as, for example, O-rings, may be positioned on an outer circumferential surface of the shuttle 440 (or piston). For example, a first seal 1, a second seal 2, a third seal 3, and a fourth seal 4, are positioned on the outer circumferential surface of the shuttle 440. In this example, the first seal 1 (or inlet end seal 1) may be positioned at an inlet end portion of the shuttle 440, the fourth seal 4 (or outlet end seal 4) may be positioned at an outlet end portion of the shuttle 440, and the second and third seals 2, 3 may be positioned at an intermediate portion of the shuttle 440, between the first seal 1 and the fourth seal 4. Simply for ease of discussion and illustration, the chamber 450 shown in FIGS. 5A-5D is defined by a substantially cylindrical bore, and the shuttle 440, is substantially cylindrical, corresponding to the chamber 450. However, in some implementations, the chamber 450 may have other contours, or cross sections, based on a contour or a cross section of the shuttle 440 to be received in the chamber 450, and allowing for engagement between the seals 1, 2, 3, 4, or surfaces of other types of sealing devices provided on the shuttle 440, with the inner surface of the chamber 450 to be described herein. In another embodiment, seals 2 and 3 may be combined into a single seal to span the control space port 410A gap and then only three total seals may be sufficient.

A geometry of the shuttle 440 (for example, cross sectional area/cross sectional shape, and other parameters associated with the geometry of the shuttle 440 and its interaction with the chamber 450) may be determined based on operating parameters critical to the proper operation of the shuttle 440 in the chamber 450. For example, given that pressure is a measure of force divided by area, and force is the product of mass and acceleration, cross-sectional area of the shuttle 440 may be governed by following:

if shuttle retaining forces=frictional forces+[(mass of shuttle)*(acceleration of gravity)]

then (cross-sectional area*fuel pressure)>shuttle retaining forces and

[(cross-sectional area*fuel pressure)+(shuttle retaining forces)]<actuation force ($F1$)

Determination of the cross sectional area of the shuttle 440 in this manner may allow operation of the shuttle 440 in the chamber 450 that provides for proper operation and biasing of the shuttle 440 in the chamber 450 without additional biasing members such as springs and the like. In some implementations, a collar 475 on the shuttle 440 may be included to assist the biasing of shuttle 440. In other implementations, spring(s) (not shown) may also be included to assist in biasing the shuttle 440; however, the spring(s) may not be required if the shuttle 440 is designed in accordance with the parameters as described above.

In this arrangement, at least three of the four seals 1, 2, 3, 4, or dynamic sealing surfaces, will be engaged with an inner peripheral portion of the chamber 450 at any one time. During an intermediate, transitional state, all four of the seals 1, 2, 3, 4, or dynamic sealing surfaces, will be engaged with the inner peripheral portion of the chamber 450.

FIGS. 5A-5D are partial cutaway views of the valve assembly 400, illustrating various stages of operation of the valve assembly 400. Further, in the sequence of operation illustrated in FIGS. 5A-5D, the fuel dispensed by the valve assembly 400 and refilled into the valve assembly 400 is illustrated by a pattern of open circular dots in the respective portions of the valve assembly 400, simply for clarity.

Figure 5A:
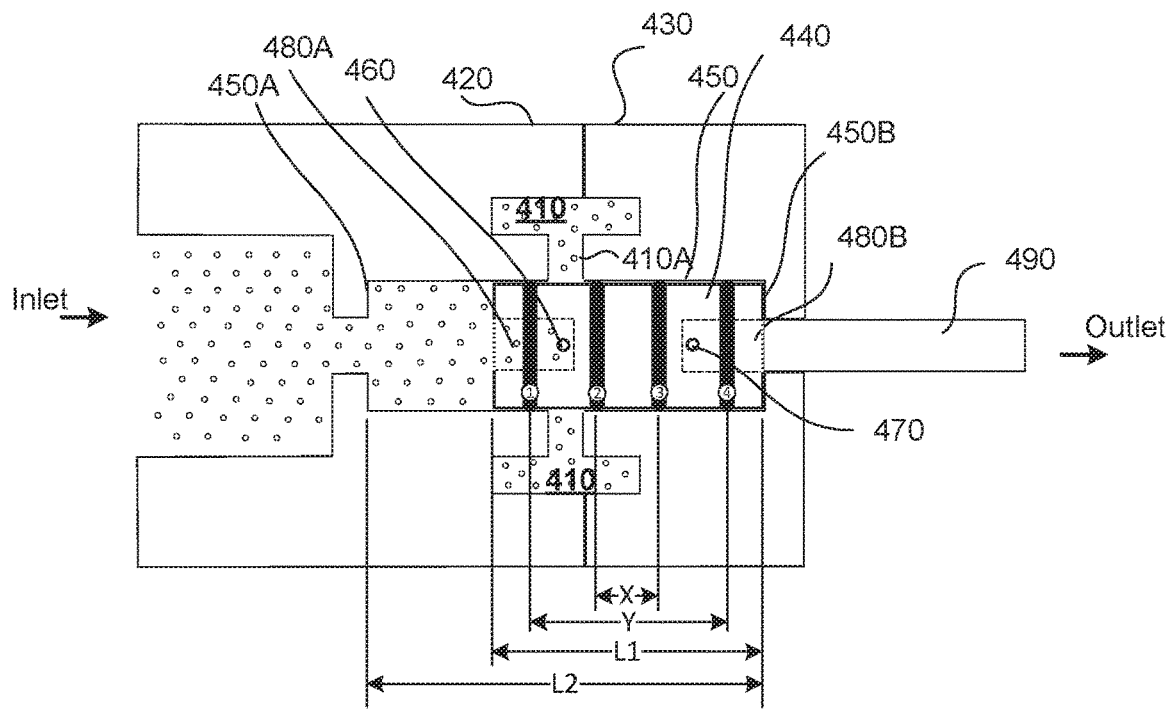
FIGS. 5A-5D are schematic diagrams of operations of the valve assembly according to example embodiments.

FIG. 5A illustrates the valve assembly 400 in a pressurized, or filled state. In the pressurized, or filled state, fuel is contained in a control volume, or a control space, ready to be dispensed in response to an actuation mechanism 120 of the tool 100 applying force F1 to the valve assembly 400 in the direction of shuttle movement resulting in dispense of fuel.

A central inlet passage 480A of the shuttle 440 may extend to a control space inlet passage 460. A control space outlet passage 470 may extend through a second wall portion of the shuttle 440, to a central outlet passage 480B. A length L2 of the cylindrical chamber 450 may be greater than a length L1 of the shuttle 440, to allow for axial movement of the shuttle 440 within the chamber 450. The control space 410 may be defined by a void formed within the main valve body 420/valve cap 430. In some implementations, a volume of the control space 410 may correspond to a previously defined volume of fuel to be dispensed from fuel originating in the canister 200.

As noted above, in some implementations, the discharge of the previously defined amount of fuel from the valve assembly 400 may be controlled based on, for example, a volume of the control space 410, such that substantial portion of the fuel contained in the control space 410 is discharged in response to actuation. The geometry of the control space 410 may define a predetermined and fixed volume. In some implementations, the volume of the control space 410 may be manually adjusted in response to user input. In some implementations, the discharge of the previously defined amount of fuel from the valve assembly 400 may be controlled based on, for example, an amount of open time of the valve assembly 400, a fuel flow rate/discharge rate of the valve assembly 400, and/or other such factors. Hereinafter, simply for ease of discussion and illustration, the valve assembly 400 will be discussed with respect to operation in which a volume of the control space 410 corresponds to the previously defined amount, or volume, of fuel to be dispensed.

A geometry of the shuttle 440 (for example, shuttle length, O-ring spacing, inlet spacing, control valve opening, and other parameters associated with the geometry of the shuttle 440 and its interaction with the chamber 450) may be determined based on operating parameters relative to the proper operation of the shuttle 440. For example, the length of the shuttle 440, the length of the shuttle chamber 450, and the diameter or length of the control space port 410A in a symmetric design would follow the parameters outlined below for successful operation. This assumes reflective symmetry of the shuttle 440 along the midpoint in the length direction, or in the direction of travel, as well as respective alignment of midpoints for the port 410A and the chamber 450. In the example shown in FIG. 5A, a distance X is defined as the distance between respective sealing surfaces of the second seal 2 and the third seal 3. The engagement of the second seal 2 and the third seal 3 with the chamber 450 may be otherwise defined as forming the inner sealing surfaces adjacent to the control space inlet passage 460 and outlet passage 470, respectively. Similarly, the distance Y may be defined as the distance between respective sealing surfaces of the first seal 1 and the fourth seal 4, but may otherwise be defined as the outermost sealing surfaces of the shuttle 440 as shown in FIG. 5A. If the distance X is greater than or equal to the diameter of the port 410A, then a relationship may be defined for both L1 and L2 with respect to X, according to Equation 1:

$$L1 + \frac{X}{2} \leq L2 \qquad \text{Equation 1}$$

That is, the length L2 of the chamber 450, or the distance between the first lateral wall 450A and the second lateral wall 450B of the chamber 450, may be greater than or equal to the length L1 of the shuttle 440 plus X/2 for a minimum length L2 of the chamber 450. The exemplary geometry of a chamber 450 having a length L2 equal to about L1+2X shown in FIGS. 5A-5D provides sufficient clearance for the shuttle 440 to successfully transition between states. A maximum length L2 of the chamber 450 may also be defined with respect to Y, according to Equation 2:

$$L2 \leq \frac{L1 - Y}{2} + 2Y \qquad \text{Equation 2}$$

Equation 1 may define a minimum length L2 for the chamber 450 based on a geometry of the shuttle 440, with the chamber 450 and shuttle 440 being substantially symmetric in direction of shuttle 440 movement. Equation 2 may define a maximum length L2 of the chamber 450 based on a geometry of the shuttle 440, the chamber 450 and shuttle 440 being substantially symmetric in direction of shuttle 440 movement. Relative lengths of the chamber 450 and shuttle 440 may fall outside of the relationships defined by Equations 1 and 2 for a non-symmetric, or asymmetric, chamber 450 and shuttle 440 as well as non-alignment of midpoints for the shuttle 440, chamber 450, and control space port 410A.

Figure 5B:
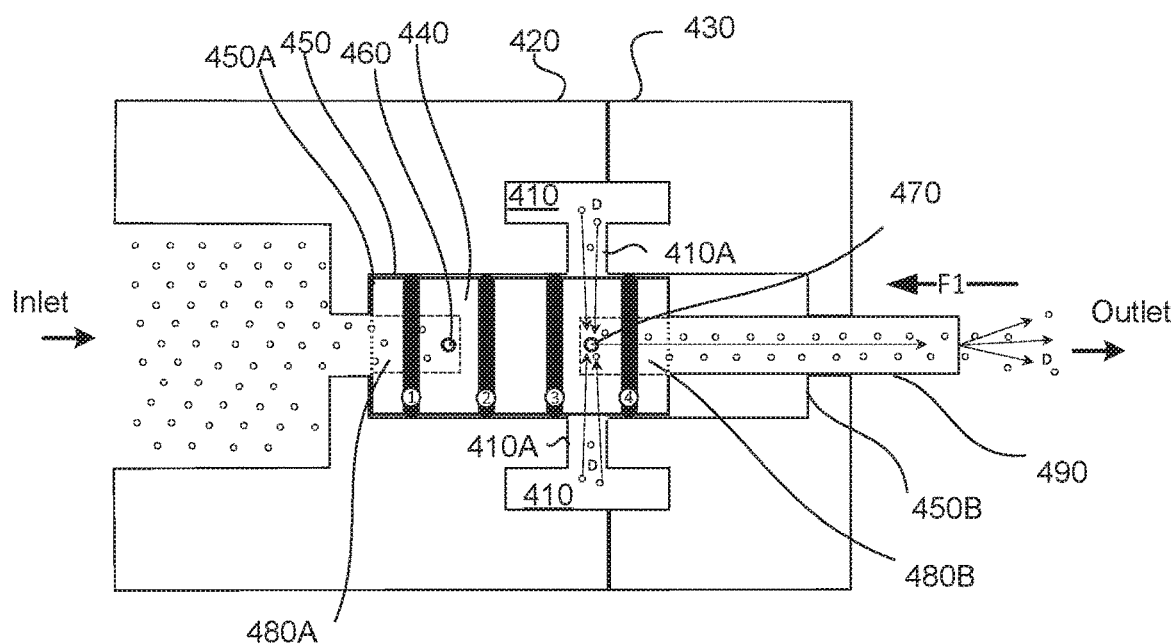

In the example arrangement shown in FIG. 5B, the valve assembly 400 is in a dispensing position, in which the shuttle 440 has moved from the normally closed pressurized position shown in FIG. 5A, and is in first position relative to the chamber 450. In this first position of the shuttle 440, fuel contained within the control space 410, is discharged (for example, to the combustion chamber 130 of the tool 100 as described in the example above). The first seal 1 and the second seal 2 are in contact with the main valve body 420, and the fourth seal 4 is in contact with the valve cap 430. In the arrangement shown in FIG. 5B, the third seal 3 is engaged with the valve body 420. However, in some situations, the third seal 3 may not necessarily be engaged with the valve body 420. In FIG. 5B, the shuttle 440 has been biased into the first position relative to the cylindrical chamber 450 in response to actuation force on the outlet valve stem 490. Actuation of the valve stem 490 may occur in response to depression of the nose 110 against the workpiece, as described above. Thus, depression of the nose 110 of the tool 100 against the workpiece may exert an actuation force F1 at the valve stem 490, causing the shuttle 440 to move into the first position, in which a first end of the shuttle 440 is pressed against a first lateral wall 450A of the chamber 450. In this position, the pressurized fluid available at the inlet passage 460 is blocked from entering control space 410 by the second seal 2. In the first position shown in FIG. 5B, flow from the control space 410 to the outlet passage 470 is open. This allows fuel contained in the control space 410 to flow out of the control space 410, through a control space port 410A and the outlet passage 470 between the third and fourth seals 3, 4, and out of the valve 400 through the valve stem 490, as illustrated by the arrows D in FIG. 5B. The shuttle 440 may remain in the first position relative to the chamber 450 until the force F1 applied by the tool actuation mechanism 120 is relieved. Release of the actuation force F1, and remaining force exerted by gas pressure may cause the shuttle 440 to move from the first position shown in FIG. 5B, through a transitional state shown in FIG. 5C, and towards a second position shown in FIG. 5D.

In the first position described above with respect to FIG. 5B, substantially all of the fuel contained in the control space 410 may be dispensed in response to the actuation of the valve stem 490. In this example, the amount, or volume, of fuel contained in the control space 410 and dispensed as described above corresponds to a previously defined amount, or volume, of fuel. The previously defined amount, or volume of fuel (at a predetermined pressure set by a regulator) may correspond to an amount of fuel required to generate a force from combustion in the combustion chamber 130 of the tool 100 needed to drive the piston 160 in the cylinder 165, and drive the fastener 180 into the workpiece, as described above.

Figure 5C:
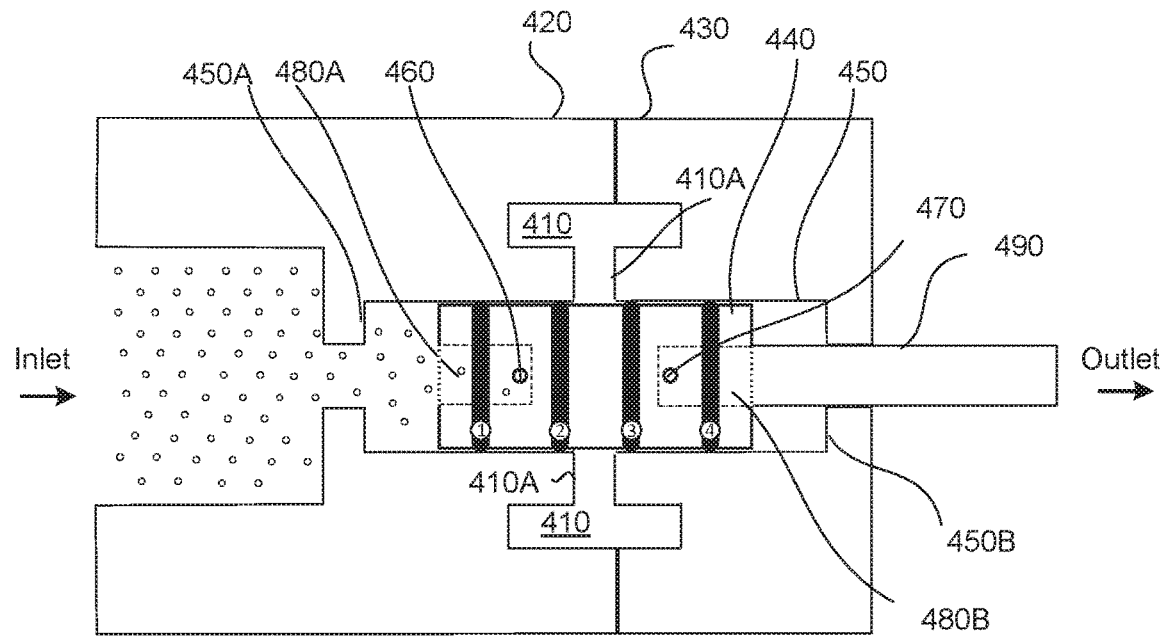

In the example arrangement shown in FIG. 5C, the valve assembly 400 is in a transitional state, in which the shuttle 440 is between filling and dispensing states. In FIG. 5C, the shuttle 440 is in an interim position with respect to the chamber 450, and is moving from the first position shown in FIG. 5B, to a second position shown in FIG. 5D or from the second position to the first position. In the interim position shown in FIG. 5C, the first seal 1, the second seal 2, the third seal 3 and the fourth seal 4 are all engaged with the inner peripheral wall of the chamber 450. In the example shown in FIG. 5C, the first and second seals 1, 2 are engaged with, or in contact with, the main valve body 420, and the third and fourth seals 3, 4 are engaged with, or in contact with, the valve cap 430. In this particular interim position (in which the shuttle 440 is moving between the first position shown in FIG. 5B and the second position shown in FIG. 5D, or between the second position shown in FIG. 5D and the first position shown in FIG. 5B), the three main regions of the fuel delivery valve 400 are isolated from one another. That is, in this interim position, the inlet passage 460 and the outlet fluid passage 470 are isolated from the control space 410. For example, as shown in FIG. 5C, the contact of the first and second seals 1, 2 with the main valve body 420 essentially close, or seal off, or isolate, the inlet passage 460 to the control space 410. Similarly, the contact of the third and fourth seals 3, 4 with the valve cap 430 essentially close, or seal off, or isolate, the outlet passage 470 from receiving fuel from the control space 410 and/or discharging fuel from the valve 400.

Figure 5D:
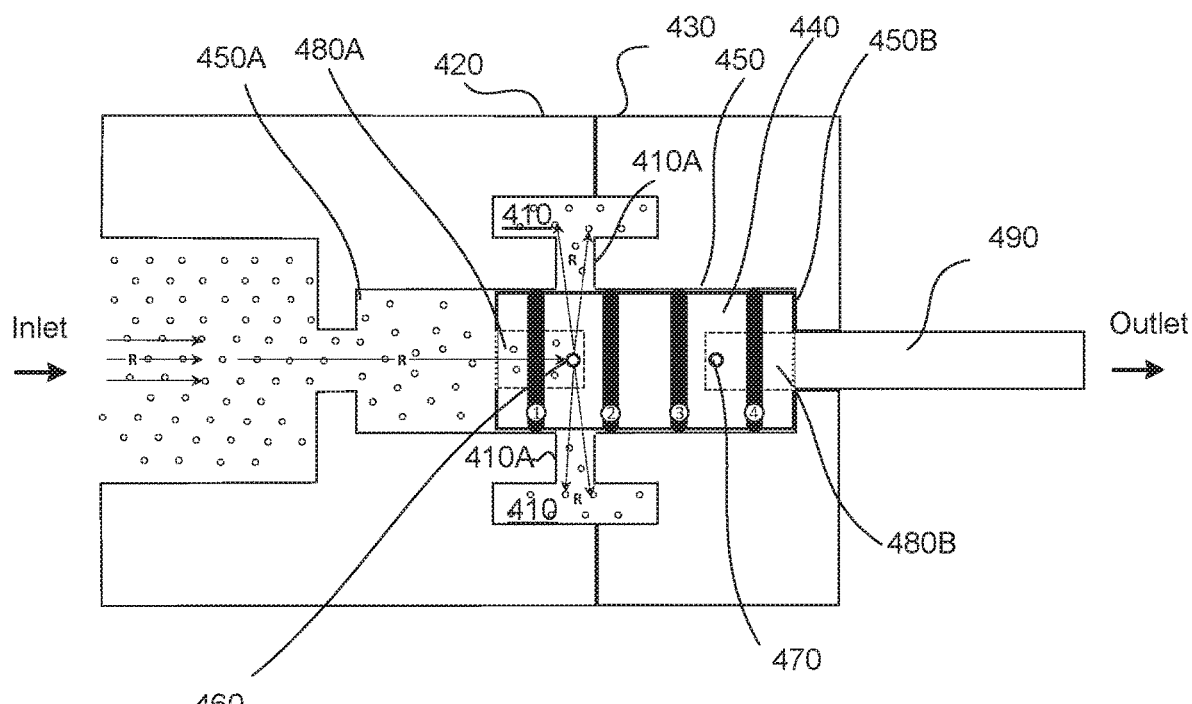

In the example arrangement shown in FIG. 5D, the valve assembly 400 is in a filling position, in which the shuttle 440 is in the second position with respect to the chamber 450. This may also be known as the normally closed position of the valve assembly 400. In the second position, the first seal 1 is engaged, or in contact with, the inner peripheral surface of the chamber 450 at the main valve body 420. In the second position, the third and fourth seals 3, 4 are engaged, or in contact with, the inner peripheral surface of the chamber 450 at the valve cap 430, blocking fluid flow from the control space 410 to the outlet passage 470. In the arrangement shown in FIG. 5D, the second seal 2 is engaged with the valve cap 430. However, in some situations, the second seal 2 may not necessarily be engaged with the valve cap 430. In the filling position, or the second position of the shuttle 440 in the chamber 450, the control space 410 is open to the inlet passage 460. Fuel may be supplied, for example, from the canister 200 into the valve assembly 400. From the central inlet passage 480A, fuel may flow through the inlet passage 460 and into the control space 410 through the control space port 410A, as shown by the arrows R in FIG. 5D. FIG. 5D illustrates the filling of the control space 410 at an interim point, in which the filling process is ongoing and the control space 410 is partially filled with fluid (i.e., a liquid/gaseous fuel mixture). The filling process may be continued until the control space 410 is filled and fully charged, or pressurized, as shown in FIG. 5A.

When in the filling position, a pressure differential between the pressure in the canister 200 and a pressure in the evacuated control space 410 may draw fuel from the canister 200 into the control space 410, causing the fuel to fill the control space 410. Filling of the control space 410 may be complete when a pressure between the canister 200 and the valve assembly 400 is essentially equalized and there is no further space to be filled in the control space 410. Pressure in the canister 200 may also force the shuttle 440 to move in the chamber 450, in a direction away from the canister 200 (i.e., in a direction toward the second lateral wall 450B of the chamber 450), biasing the shuttle 440 into the second position shown in FIG. 5D, and opening the flow path through the inlet passage 460 into the control space 410 through the control space port 410A. This pressure from the canister 200 may maintain the shuttle 440 in the second position, allowing fuel to flow through the inlet passage 460 and into the control space 410 until filling of the control space 410 has been completed.

In the example shown in FIG. 5C, the shuttle 440 is moving in the chamber 450, from the first position shown in FIG. 5B, to the second position shown in FIG. 5D (i.e., from a position adjacent to the first lateral wall 450A of the chamber 450 toward the second lateral wall 450B of the chamber 450). In this example, fuel has been dispensed from the control space 410 (as described above with respect to FIG. 5B), and because the inlet fuel passage 460 is still isolated, the control space 410 has not yet been refilled with fuel. It is noted that the shuttle 440 may also be in this transitional state, with the shuttle 440 positioned in the chamber 450 as shown in FIG. 5C, with the control space 410 pressurized and filled with fuel. This may occur when the shuttle 440 is moving in the chamber 450, from the filled second position shown in FIG. 5D to the first position shown in FIG. 5B (i.e., from a position adjacent to the second lateral wall 450B of the chamber 450 toward the first lateral wall 450A of the chamber 450) in accordance with how the valve assembly 400 is actuated in the tool 100. In this scenario, the fluid flow is being limited in both directions until reaching the first position shown in FIG. 5B.

Figure 6:
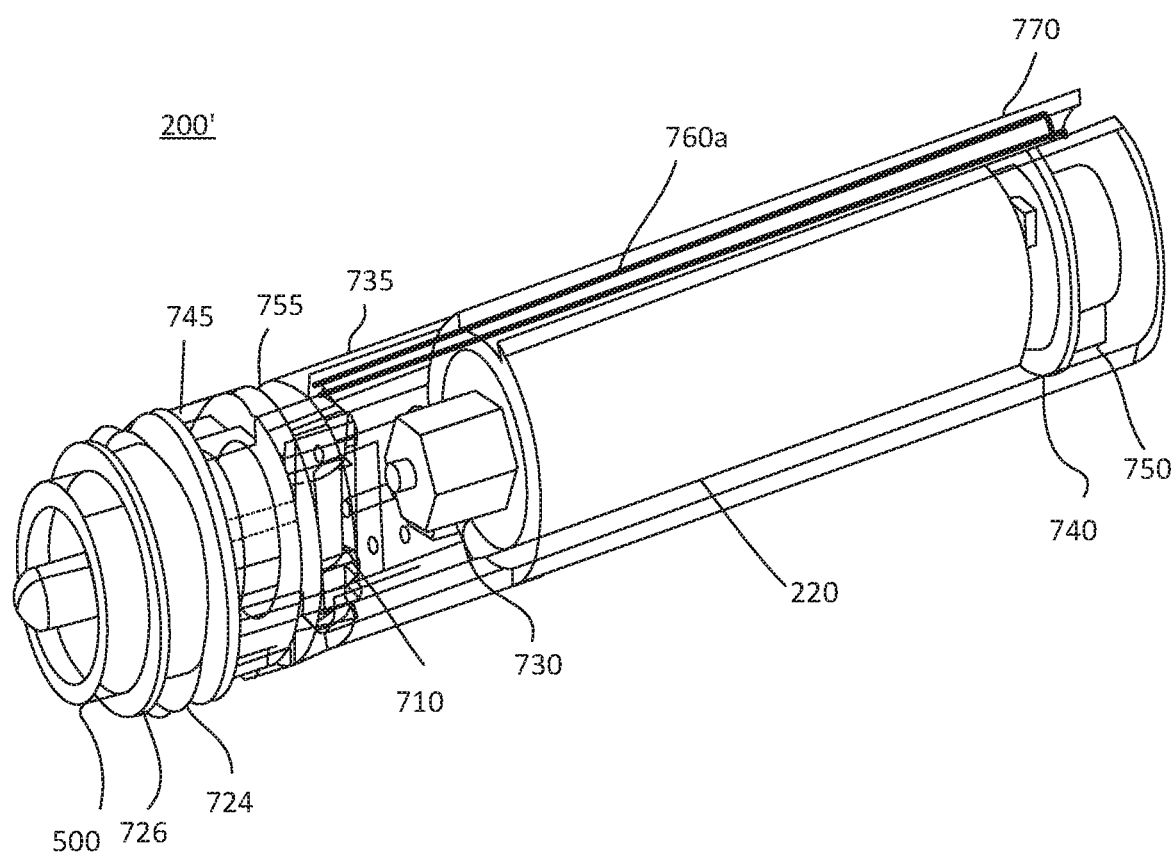
FIG. 6 is a schematic diagram of another example fuel canister according to example embodiments.
Figure 7:
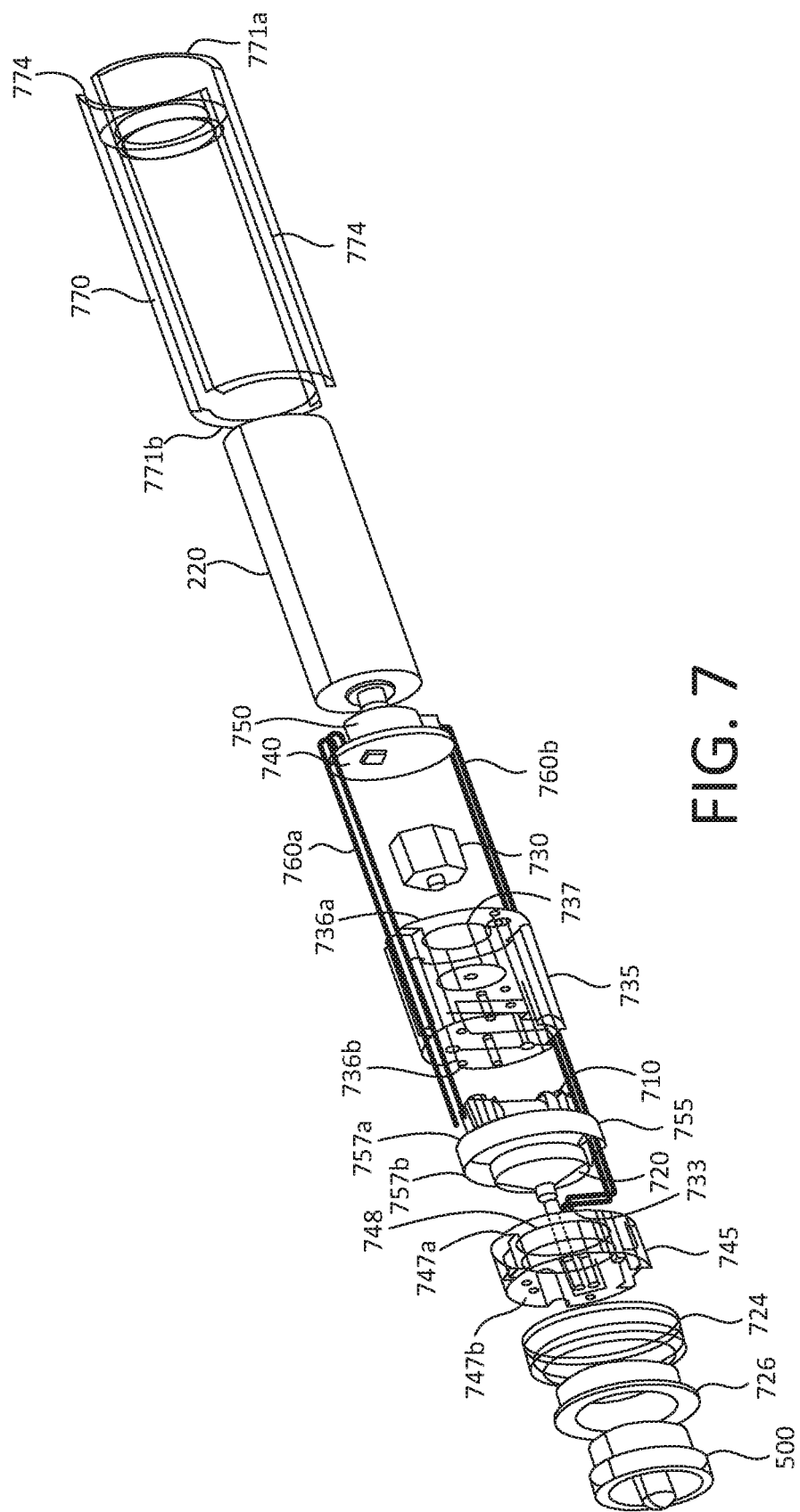
FIG. 7 illustrates an exploded diagram of the fuel canister of FIG. 6.
Figure 8:
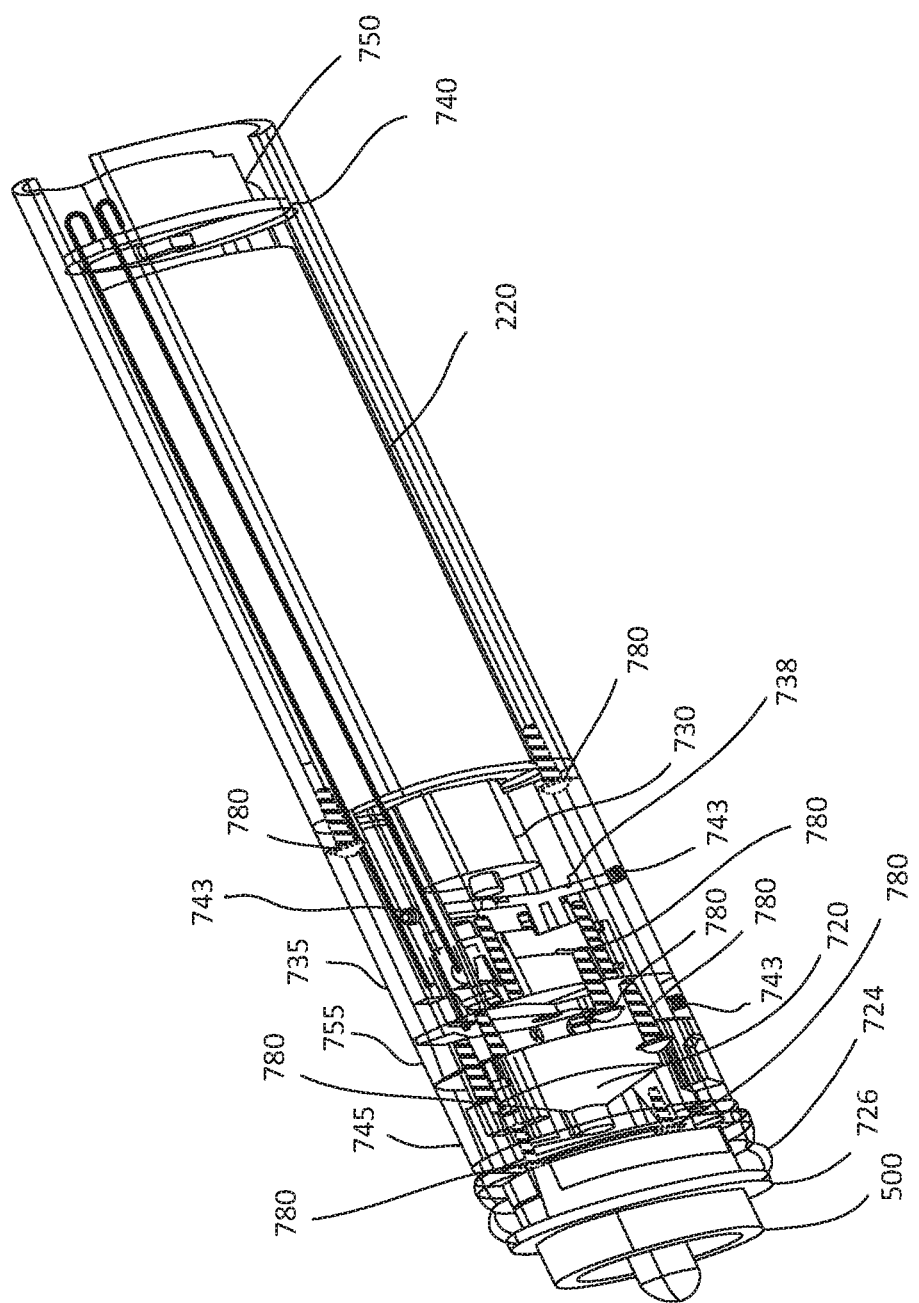
FIG. 8 is a schematic diagram of the fuel canister of FIG. 6.

FIGS. 6-8 are perspective views of another fuel canister 200' in accordance with an example embodiment. It should be appreciated that the fuel canister 200' may serve similar function to the fuel canister 200 as described in FIG. 2, except that the fuel canister 200' includes a valve assembly 400' different from the valve assembly 400 of FIG. 2. In particular, the valve assembly 400' employs an electro-mechanical valve 710 rather than a mechanical valve. In some implementations, the electro-mechanical valve 710 will be operated by an electrical circuit and power source. The electro-mechanical valve 710 may have a controlled period of opening to dispense a predetermined amount of fuel (e.g., hydrogen gas). An actuation switch may complete a resistor-capacitor circuit with timer function to complete this action, which will be described further in detail. In some implementations, an electrochemical fuel cell may be powered by the hydrogen fuel to provide the necessary electrical power. In other implementations, current may come from a power source in the tool 100 or a battery in the canister 200' such as that shown in FIGS. 6-8. However, it should be appreciated that functions and/or operations of similar respective elements will not be discussed in detail in this section.

Referring to FIGS. 6 and 7, the fuel canister 200' may include an external housing (not shown) that houses a battery-like hydrogen storage vessel 220, an electro-mechanical valve 710 (e.g., solenoid valve), a check valve 720, an adapter 730, a circuit board 740, a power source holder 750, lead wires 760a, 760b, support structures (e.g., a first support structure 735, a second support structure 745, and a third support structure 755), and a vessel storage holder 770.

The vessel storage holder 770 may surround the hydrogen storage vessel 220 to support and protect the hydrogen storage vessel 220. The vessel storage holder 770 includes a first end portion 771a and a second end portion 771b. At the first end portion 771a of the vessel storage holder 770 are the circuit board 740 and the power source holder 750. Attached to the second end portion 771b of the vessel storage holder 770 is the first support structure 735. The vessel storage holder 770 may include openings 774 that extend along the first end portion 771a and the second end portion 771b (e.g., along a longitudinal direction of the vessel storage holder 770). In an illustrated exemplary embodiment, there are two openings 774 directly opposite of each other. One of the openings 774 may allow the lead wires 760a extending out from the circuit board 740 to connect to the electro-mechanical valve 710. The other opening 774 may allow the lead wires 760b extending out from the circuit board 740 to connect to a control switch 733 which operates the electro-mechanical valve 710.

The circuit board 740 may be used as a timing operation to open and close the electro-mechanical valve 710. In some implementations, the circuit board 740 may be a resistor-capacitor (RC) circuit. In an example operation, the circuit board 740 may control a release mechanism of the electro-mechanical valve 710 to open and close a valve (e.g., solenoid valve). A normally closed valve can be opened by magnetic force generated with electric current through the solenoid. A quantity of fuel released from the outlet adapter 500 can be determined by the electro-mechanical valve 710 functions and/or operation. This can be achieved through, for example, but not limited to, geometry of the valve, opening for predetermined time, and/or other methods. In an illustrated exemplary embodiment, the circuit board 740 may be circular shaped to conform to the shape of the hydrogen storage vessel 220. It should be appreciated that other shapes may be employed as long as the circuit board 740 fits inside of the fuel canister 200. In other implementations, the timing circuit may be located inside the tool 100.

The power source holder 750 may be attached to circuit board 740 on one side of the circuit board 740. In some implementations, the power source holder 750 may include a battery (e.g., coin cell) to provide a power source for the electro-mechanical operation. In other implementations, the power source may be supplied by capacitors and/or electro-chemical fuel cells supplied with stored hydrogen. In some implementations, power can be supplied by other methods internal to the canister 200' such as a hydrogen fuel cell located in the canister 200 or possibly in the tool 100. For example, the power may also be provided from a multitude of sources including the stored pressure of the hydrogen, an external power source, a main/auxiliary power source of the tool 100 (e.g., tool battery), and/or harvested kinetic energy from actuation input during normal equipment operations (e.g., piezoelectric effect).

The first support structure 735 includes a first end portion 736*a* and a second end portion 736*b*. The adapter 730 may be provided at the first end portion 736*a*. The adapter 730 may be connected to an outlet of the hydrogen storage vessel 220 to discharge the fuel (e.g., hydrogen) to the electro-mechanical valve 710 (e.g., solenoid valve) and eventually to the outlet adapter 500. In some implementations, the adapter 730 may be connected to an outlet of the hydrogen storage vessel 220 by screwing the adapter 730 to the outlet of the hydrogen storage vessel 220, each having corresponding threaded connections. Other methods to couple the adapter 730 to the outlet of the hydrogen storage vessel 220 may be used, such as, for example, bolts and nuts, screws and tapped holes, rivets, snap/press fittings, welding, solvents, adhesives, etc. The first support structure 735 may include an internal cut-out portion 737 that conforms to a shape of the adapter 730 so that the adapter 730 fits inside of the first support structure 735 at the first end portion 736*a*.

The electro-mechanical valve 710 may be provided at the second end portion 736*b* of the first support structure 735. Similarly, the first support structure 735 may include an internal cut-out portion 738 that conforms to a shape of the electro-mechanical valve 710 so that the electro-mechanical valve 710 fits inside of the first support structure 735 at the second end portion 736*a*. As shown in FIG. 8, the first support structure 735 may include an internal pipe structure 738 (e.g., conduits, tubes, channels, ducts, etc.) connecting an outlet of the adapter 730 to the electro-mechanical valve 710, in which the fuel travels. In some implementations, the configuration of the internal pipe structure 738 may be dependent upon a particular geometry of the electro-mechanical valve 710. For example, as illustrated in FIG. 8, fuel travels from the outlet of the adapter 730 and branches to the left and right and enters at respective intake ports of the electro-mechanical valve 710. During construction, the internal pipe structure 738 may be formed by drilling holes in the first support structure 735, which may depend upon the geometry of the electro-mechanical valve 710, and sealed by a fastening member 743 (e.g., a set screw), for example.

The electro-mechanical valve 710 including the solenoid valve may convert electrical energy into mechanical energy, in turn, opens or closes the valve mechanically. For example, when the solenoid is activated, a plunger (not shown) may push on the valve, thereby opening the valve. This action allows, for example, hydrogen in the vessel storage vessel 220 to flow through the adapter 730 and solenoid valve and into the outlet adapter 500 to the combustion chamber 130 of the tool 100. Hydrogen fuel would be prevented from entering the combustion chamber 130, or leaving the vessel storage vessel 220 unless the solenoid has been activated. If the solenoid is deactivated, the flow of hydrogen fuel is shut-off. Thus, the solenoid in the electro-mechanical valve 710 may be automatically and remotely controlled by the circuit board 740 connected to the solenoid. A control switch 733 may be connected to the circuit board 740 via wires 760*b* and may be activated by depression of the outlet adapter 500.

The second support structure 745 includes a first end portion 747*a* and a second end portion 747*b*. The check valve 720 may be provided at the first end 747*a* to prevent backpressure and atmospheric contamination from entering the electro-mechanical valve 710. The second support structure 745 may include an internal cut-out portion 748 that conforms to a shape of the check valve 720 so that the check valve 720 fits inside of the second support structure 745 at the first end portion 747*a*. The contact switch 766 may be connected to the circuit board 740 via the lead wires 760*b*. In some implementations, the second support structure 745 may include a central piping (not shown) such that hydrogen fuel travels from an outlet port of the check valve 720 to the outlet adapter 500 and eventually to the combustion chamber 130 of the tool 100.

A cap member 724 may be provided at the second end portion 747*b* of the second support structure 745. The cap member 724 may enclose an open end of the fuel canister 200'. In some implementations, the cap member 724 may be attached to the housing 210 of the fuel canister 200'. The cap member 724 may be attached to the fuel canister 200' using a fastener 780, such as, for example, a screw inserted into the second support structure 745 (as shown in FIG. 8). Other fasteners, including but not limited to, nut and bolt, claps, clips, rivets, and/or welding methods (e.g., brazing, soldering, spot welding, etc.), may be employed to attach the cap member 724 to the fuel canister 200'. In some implementations, the cap member 724 may be made from a metal material and crimped to an outer surface of the housing 210 of the fuel canister 200'. For example, the cap member 724 may be made from aluminum. In some implementations, the cap member 724 and the housing 210 of the fuel canister 200' may be made from a same material, such as, for example, aluminum.

An outlet adapter receptacle 726 may be inserted into the cap member 724 to hold and support the outlet adapter 500. In other words, the outlet adapter receptacle 726 may be securely attached to an inside portion of the cap member 724, and configured to hold various outlet adapters 500. In some implementations, the outlet adapter receptacle 726 may be coupled to the inside portion of the cap member via a tight frictional connection (e.g., an outer circumference surface of the outlet adapter 726 being less than an inner circumference surface of the cap member 724). Other means may be employed to couple the outlet adapter receptacle 726 to the inside portion of the cap member 724, such as, for example, screws, nuts and bolts, rivets, clips, and/or glue. The outlet adapter receptacle 726 may be generally composed of plastic material, such as, for example polyethylene, polypropylene, and/or polyurethane. In other implementations, the outlet adapter receptacle 726 may be constructed from metal, wood, or any other suitable material.

The third support structure 755 includes a first end portion 757*a* and a second end portion 757*b*. In some implementations, the electro-mechanical valve 710 may be provided at the first end portion 757*a* and the check valve 720 may be provided at the second end portion 757*b*. Hence, the third support structure 755 may be between the electro-mechanical valve 710 and the check valve 720. Described in another manner, the third support structure 755 may be disposed between the first support structure 735 and the second support structure 745. In some implementations, the third support structure 755 may include a central piping (not shown) such that hydrogen fuel travels from an outlet port of the electro-mechanical valve 710 to an inlet port of the check valve 720.

As shown in FIG. 8, the support structures (e.g., the first support structure 735, the second support structure 745, and the third support structures 755) may be attached to each other by means of fasteners 780. For example, screws may be used to attached the first, second, and third support structures 735, 745, 755. Other fasteners, including but not limited to, nut and bolt, claps, clips, rivets, and/or welding methods (e.g., brazing, soldering, spot welding, etc.), may be employed to attach the first, second, and third support structures 735, 745, 755 together.

FIGS. 9-14 are schematic block diagrams of various features included in an exemplary fuel canister according to example embodiments. It should be appreciated that the features illustrated in FIGS. 9-14 may be employed in both the fuel canister 200 described in FIGS. 2-5 or the fuel canister 200' described in FIGS. 6-8.

Each of FIGS. 9-14 illustrate a fuel canister 200 (or 200') including a housing member 210 that houses a hydrogen storage vessel 220, a valve assembly 300 (e.g., a valve and a check valve), and an interface or outlet adapter 500 to engage with the tool 100. Further, it should be appreciated that functions and/or operations of similar respective elements will not be discussed in detail in this section.

Figure 9:
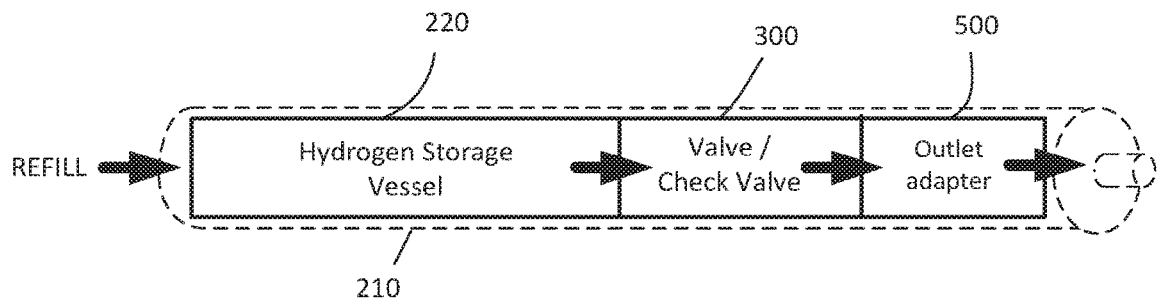
FIG. 9 is a schematic block diagram of an exemplary fuel canister according to example embodiments.

Referring to FIG. 9, the hydrogen storage vessel 220 may be disposed inside of the housing member 210. In some implementations, the hydrogen storage vessel 220 may be removed from the housing member 210 and refilled with hydrogen fuel. In some implementations, the hydrogen storage vessel 220 may be permanently affixed inside of the housing member 210. In other words, the hydrogen storage vessel 220 cannot be removed from the housing member 210 of the fuel canister 200 (or 200'). In order to refill the hydrogen storage vessel 220, hydrogen fuel is introduced into the hydrogen storage vessel 220 externally through the housing member 210. The hydrogen storage vessel 220 can be refilled from any of various sources of hydrogen at a pressure greater than or equal to a charging pressure contained in the hydrogen storage vessel 220. For instance, a hydrogen tank containing compressed hydrogen can be used to refill the hydrogen storage vessel 220.

In some implementations, the hydrogen storage vessel 220 may include a port (not shown) for refilling the hydrogen storage vessel 220. It should be appreciated that there may also be a corresponding port extending into the housing member 105 to supply the hydrogen into the hydrogen storage vessel 220. In one implementation, the port may be located at a bottom of the housing member 210 of the fuel canister 200 or 200'. This provides easy access to the hydrogen storage vessel 220 and convenient method for refilling. In other implementations, the port may be located at sidewalls of the housing member 210 to refill the hydrogen storage vessel 220 of hydrogen.

In some implementations, the hydrogen storage vessel 220 may include two ports. For example, one of the ports may be used to fill the hydrogen storage vessel 220 with hydrogen and the other port may be used to release the hydrogen stored in the hydrogen storage vessel 220. Generally, hydrogen stored inside of the hydrogen storage vessel 220 should be released to empty the hydrogen storage vessel 220 or achieve equilibrium pressure in the hydrogen storage vessel 220.

Figure 10:
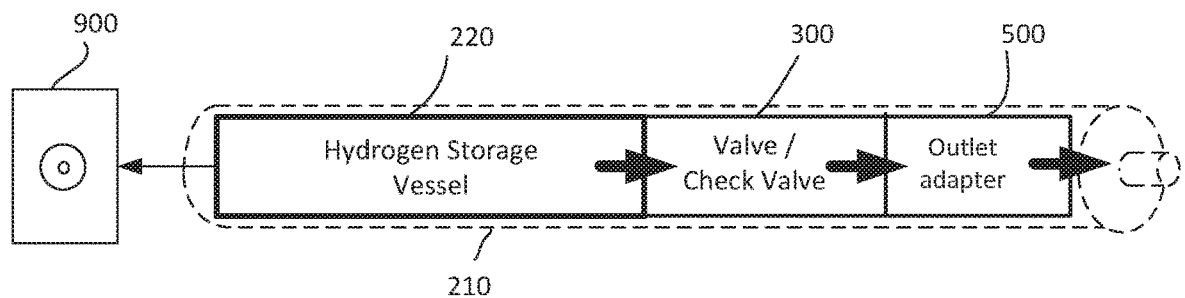
FIG. 10 is a schematic block diagram of an exemplary fuel canister including at least a water electrolysis device according to example embodiments.

In some implementations, as shown in FIG. 10, the hydrogen storage vessel 220 may be removed from the housing member 210 of the fuel canister 200 or 200' for refilling purpose. In this example embodiment, the hydrogen storage vessel 220, which is in a battery-like form, may be removed from the housing member 210 and inserted into a water-electrolysis refillable device 900 to be refilled with hydrogen. This is more convenient for filling purpose, similar to separately charging a tool battery, since the entire fuel canister 200 or 200' does not need to be handled/carried for refilling. Additionally, this permits having only one refillable fuel canister 200 or 200' while refueling multiple storage vessels. Further, if one of the storage vessels 220 may be damaged or loses capacity, it can be easily replaced with another storage vessel 220. For instance, in use, while one storage vessel 220 placed in the fuel canister 200 or 200' is being used in the tool, the other storage vessel 220 may be in a process of refilling. In some implementations, more than one storage vessel 220 may be refilled at the same time. For example, the water-electrolysis refillable device 900 may contain more than one refilling port, so that several storage vessels 220 may be refilled concurrently (e.g., at the same time). This helps save time in recharging capacity.

In order to remove the hydrogen storage vessel 220 from the fuel canister 200 or 200', a closure cap (not shown) may be formed at a bottom of the fuel canister 200 or 200'. The closure cap may be completely removed (e.g., detached) from the housing member 210 of the fuel canister 200 or 200'. In some implementations, the closure cap may include a threaded connection member that correspondingly engages with a threaded connection member formed on a bottom end of the housing member 210. For example, the closure cap may include threads on an inner circumferential surface that correspondingly engages with threads formed on an exterior circumferential surface of the housing member 210. In other implementations, the threaded connection member of the closure cap may be in a reversed manner. For example, the closure cap may include threads on an outer circumferential surface to correspondingly engage with threads formed on an inner circumferential surface of the housing member 210. In use, to replace the hydrogen storage vessel 220, a user would unscrew the closure cap, (optionally) unscrew the hydrogen storage vessel 220 that is coupled to the adapter 730 (shown in FIG. 7), slide the hydrogen storage vessel 200 out of the housing member 210, insert a new hydrogen storage vessel 220 into the housing member 210, and tightly screw the closure cap back onto the housing member 210.

Besides the threaded connection member described above, other means may be employed to remove the hydrogen storage vessel 220 from the housing member 210. For example, the bottom of the fuel canister 200 or 200' may have a hinged door to open and close the door and release the hydrogen storage vessel 220. In some implementations, a quick-release mechanism may be used to release the hydrogen storage vessel 220 out of the housing member 210. For example, the quick-release mechanism may include a latch connected to a button that is mounted on a sidewall of the fuel canister 200 or 200' to release the hydrogen storage vessel 220 out of the housing member 210.

In some implementations, a cooling device (not shown) may be employed with the hydrogen storage vessel 220 at the time when the hydrogen storage vessel 220 is removed from the housing member 210. For example, the cooling device, such as, but not limited to, a fan or a cooling jacket (or bath), may be installed at the refillable device 900. The cooling device may expedite a process of filling the hydrogen storage vessel 220 since the lower temperature may reduce the pressure contained in the hydrogen storage vessel 220.

Figure 11:
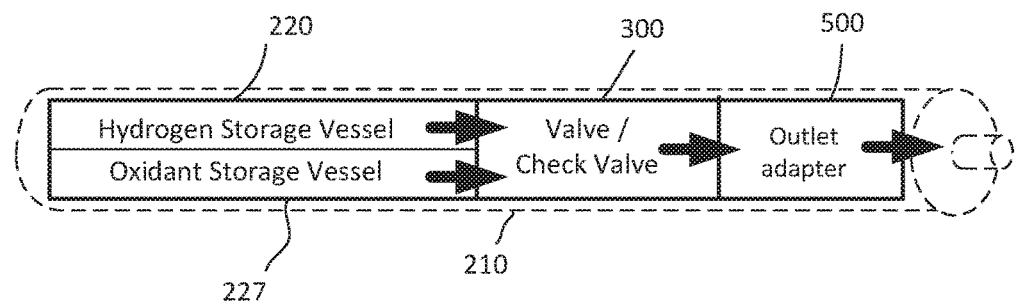
FIG. 11 is a schematic block diagram of an exemplary fuel canister including at least an oxidant storage vessel according to example embodiments.

In some implementations, as shown in FIG. 11, an oxidant storage vessel 227 may be included in the fuel canister 200 or 200'. The oxidant storage vessel 227 may contain oxygen (or an oxidant) to be mixed with hydrogen to promote combustible reaction. Other gaseous components may be included in the oxidant storage vessel 227, such as, but not limited to, nitrous oxide, ozone, or halogens, such as $Cl_2$ and $F_2$, to react with the fuel. In some implementations, the oxidant storage vessel 227 may be separate from the hydrogen storage vessel 220. In other words, the oxidant storage vessel 227 may be housed in a different housing from the hydrogen storage vessel 220. In some implementations, the oxidant storage vessel 227 may be position adjacent to the hydrogen storage vessel 220. For example, the oxidant storage vessel 227 may be positioned parallel to the hydrogen storage vessel 220, located inside of the housing member 210.

In some implementations, similar to the hydrogen storage vessel 220, the oxidant storage vessel 227 may be removable from the fuel canister 200 or 200' to be refilled with oxygen, air, or other oxidant. The oxidant storage vessel 227 may be refilled with oxidant using, for example, a refillable oxygen tank or the same electrolysis refillable device 900 used for generating hydrogen.

In some implementations, a check valve may be used to prevent mixing of fuel and oxidant. In some implementations, the check valve may be placed at outlet portions of each of the hydrogen storage vessel 220 and the oxidant storage vessel 227. In some implementations, the check valve may be disposed downstream of the hydrogen storage vessel 220 and the oxidant storage vessel 227.

Figure 12:
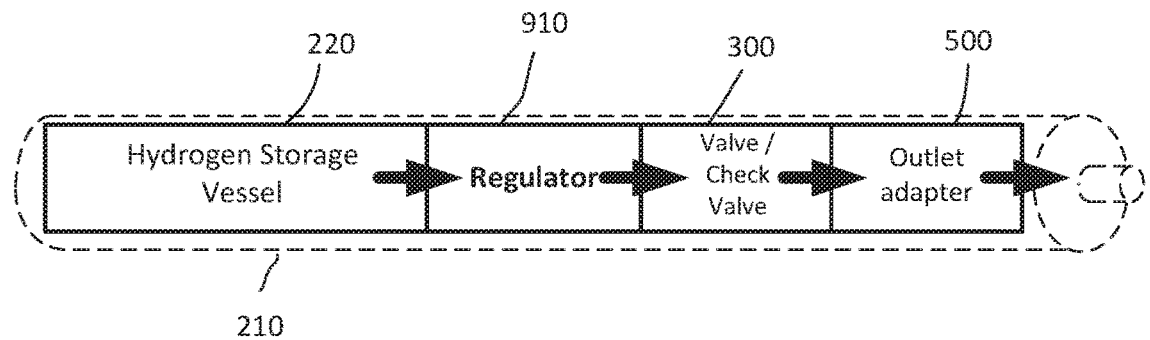
FIG. 12 is a schematic block diagram of an exemplary fuel canister including at least a regulator according to example embodiments.

In some implementations, as shown in FIG. 12, a regulator 910 may be included in the fuel canister 200 or 200' to regulate pressure. In some implementations, the regulator 910 may be located after (e.g., downstream of) the hydrogen storage vessel 220 to maintain a relatively constant output pressure from the hydrogen storage vessel 220. Hydrogen pressure in the storage vessel 220 may vary due to various factors, such as, for example, temperature, state of charge, previous history, etc. For instance, in a hot environment, the pressure inside of the fuel canister 200 or 200' may increase while a cooler environment may provide a lower pressure. As a result, an amount of fuel dispensing from the hydrogen storage vessel 200 may be inconsistent. Hence, the regulator 910 may be located before (e.g., upstream of) the valve 300 if the regulator 910 is being used for tool 100 operation. Regulation of pressure is more important for the mechanical valve where fuel metering is determined by its volume.

In some implementations, the regulator 910 may include a valve region in communication with an inlet and an outlet. The valve region may include a valve seat connected to a piston (or diaphragm) which is configured to enable translational movement to open and close an opening. The piston may be resistively biased by a biasing member in a form of a spring, for example. The regulator 910 may be operable to receive gas from the hydrogen storage vessel 220 at a high pressure, but to deliver gas at a substantially constant fixed low pressure to the outlet. The regulator 910 can operably regulate the pressure to a desirable range. This may be achieved by a feedback mechanism whereby the pressure of the gas downstream is operable to act on the piston in opposition to the biasing force of the biasing member (e.g., spring). This counter-balancing effect provides for a particular pressure at which the valve assembly is in ideal operating range and output pressure is relatively constant. Thus, at the desired particular set pressure, the biasing member and the gas forces are selected so that gas pressure acts on valve piston to maintain position until overcome by biasing force. In some implementations, there may be a filter adjacent to the seat to filter impurities in the hydrogen exiting from the hydrogen storage vessel 220.

In some implementations, the regulator 910 may be adjustable by the user to effectively control the amount of hydrogen dispensing from the hydrogen storage vessel 220 for optimal tool performance.

In some implementations, a vent mechanism (not shown) may be included and may be attached to the valve assembly 300 and/or the fuel canister 200 or 200' to reduce and/or control pressure in the fuel canister 200 or 200'. The vent mechanism may be automatically activated and relieve internal pressure inside the fuel canister 200 or 200' if internal pressure exceeds a predetermined level. Examples of a vent mechanism may include, for example, a pressure relief valve, a rupture disk, a fusible plug, or a combination of devices. Safety, compliance, and regulations for a refillable hydrogen canister may benefit or require this feature.

In some implementations, a hydrogen reservoir (not shown) may be included in the regulator 910 to allow for some gas to accumulate and buffer the flow rate during release. In other implementations, the hydrogen reservoir may be included (installed) prior to the regulator 910.

Figure 13:
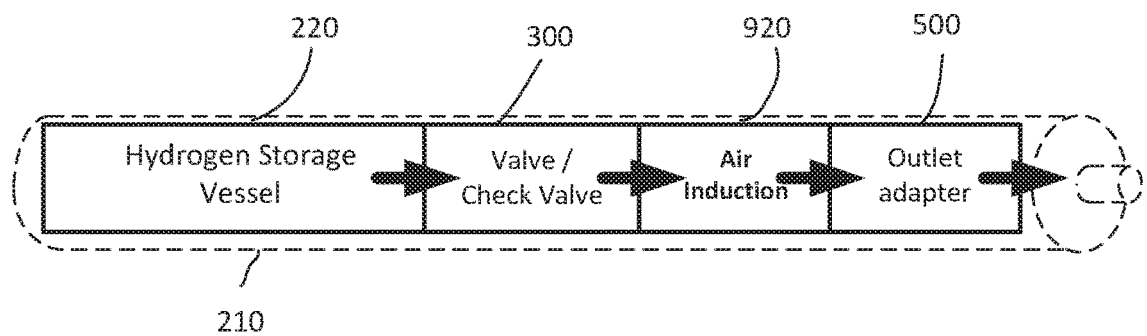
FIG. 13 is a schematic block diagram of an exemplary fuel canister including at least an air inductor according to example embodiments.

In some implementations, as shown in FIG. 13, an air induction port 920 may be included in the fuel canister 200 or 200' to promote combustible reaction. In some implementations, the air induction port 920 may be downstream from the valve assembly 300. For example, the air induction port 920 may be an opening in the first support structure 735, for example, to pull in extra air (or oxygen) and mix with the hydrogen fuel for effective combustion. In some implementations, the air induction port 920 may inject oxidant directly to promote combustible reaction of fuel. In addition to providing additional oxidant to the fuel, the extra air would help pressurize the combustion chamber 130 of the tool 100 for maximum output force. In some implementations, the air induction port 920 may narrow the passage through which the air flows, thereby increasing the velocity of the airflow via a Venturi effect. In one implementation, the air induction port 920 may be located at sidewalls of the fuel canister 200 or 200' such that the air induction port 920 can be perpendicular to the valve assembly 300. In other implementations, the air induction port 920 may be formed at an angle in the sidewalls of the fuel canister 200 or 200' with respect to the valve assembly 300.

Figure 14:
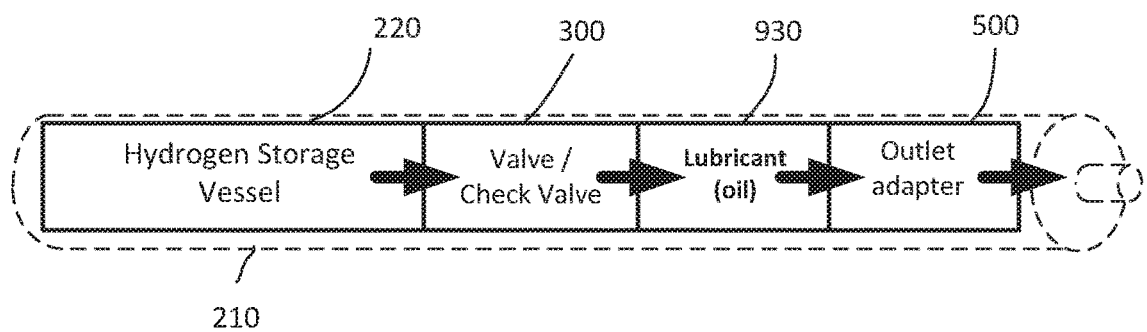
FIG. 14 is a schematic block diagram of an exemplary fuel canister including at least a lubricant according to example embodiments.

In some implementations, as shown in FIG. 14, a lubricant reservoir 930 may be included in the fuel canister 200 or 200' to be mixed with the hydrogen. The lubricant reservoir 930 may include lubricant, such as, for example, oil to add some lubricant to the fuel and extend the life of the tool 100 and/or prolong a regularly scheduled maintenance of the tool 100. When added to the fuel, the lubricant may be mixed with (e.g., nebulized or aerosolized) by the pressurized fuel and appropriate amount of fuel/lubricant may be mixed and released into the combustion chamber 130 of the tool 100. In some implementations, the lubricant reservoir 930 may be refilled with lubricant when empty via a fill port or removable cap/plug. For example, the lubricant reservoir 930 may be refilled by filling the lubricant reservoir 930 with an external lubricant tank. In some implementations, the lubricant reservoir 930 may be removable from the fuel canister 200 or 200' to be refilled. In some implementations, the lubricant reservoir 930 may be downstream from the valve assembly 300.

In some implementations, the fuel canister 200 or 200' may include a lubricant port (not shown) to diffuse lubricant (e.g., oil) into the fuel mixture and/or diffuse into the valve 300 and/or tool 100 to reduce friction of moving parts.

Power tools include, for example, nailers, drills, circular saws, jigsaws, band saws, reciprocating saws, screw drivers, angle grinders, straight grinders, hammers, impact wrenches, angle drills, inspection cameras, and the like. Test and measurement equipment includes, for example, digital multimeters, clamp meters, fork meters, wall scanners, IR temperature guns, and the like. Vacuum cleaners include, for example, stick vacuums, hand vacuums, upright vacuums, carpet cleaners, hard-surface cleaners, canister vacuums, broom vacuums, and the like. Outdoor power equipment includes blowers, chain saws, edgers, hedge trimmers, lawn mowers, trimmers, and the like. Other products utilizing heat such as steam cleaning, ironing, portable heaters, etc. may also be included. Vehicles include, for example, automobiles, motorcycles, scooters, bicycles, and the like.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element or layer, there are no intervening elements or layers present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A fuel canister for use with a combustion power tool, comprising:
a refillable hydrogen storage vessel containing metal hydride;
a valve assembly, including at least one valve to release hydrogen fuel gas, wherein the valve assembly is removable from the refillable hydrogen storage vessel;
a coupling device, the coupling device including a first coupler attached to the refillable hydrogen storage vessel and a second coupler attached to the valve assembly; and
an outlet attached to the valve assembly to supply the hydrogen fuel gas to the combustion power tool, wherein the first coupler includes a valve that is normally closed and opened when a flow of the hydrogen fuel gas from the refillable hydrogen storage vessel is actuated by an electro-mechanical device.

2. The fuel canister of claim 1, wherein the first coupler is a female fitting and the second coupler is a male fitting to couple the first coupler and the second coupler together.

3. The fuel canister of claim 1, further comprising:
a housing member having a first end portion and a second end portion; and
an outlet adapter attached to the first end portion of the housing member,
wherein the refillable hydrogen storage vessel and the valve assembly are disposed inside of the housing member.

4. The fuel canister of claim 3, further comprising:
a first support structure configured to support at least a portion of the refillable hydrogen storage vessel and at least a portion of the valve assembly, the first support structure including a first end portion and a second end portion opposite the first end portion, wherein the first end portion supports at least the portion of the refillable hydrogen storage vessel and the second end portion supports at least the portion of the valve assembly;
a second support structure configured to support at least the portion of the valve assembly, the second support structure including a first end portion and a second end portion opposite the first end portion, wherein the first end portion supports at least the portion of the valve assembly and the second end portion supports at least a portion of the outlet adapter; and
a third support structure being disposed between the first support structure and the second support structure.

5. The fuel canister of claim 4, wherein the first end portion of the first support structure includes a first internal cut-out portion that conforms to a shape of at least the portion of the refillable hydrogen storage vessel and the second end portion of the first support structure includes a second internal receiving portion that conforms to a shape of at least the portion of the valve assembly.

6. The fuel canister of claim 4, wherein the first end portion of the second support structure includes an internal cut-out portion that conforms to a shape of at least the portion of the valve assembly.

7. The fuel canister of claim 1, wherein the at least one valve of the valve assembly is a mechanical valve.

8. The fuel canister of claim 7, wherein the mechanical valve is configured to meter an amount of the hydrogen fuel gas based on volume and pressure of the hydrogen fuel gas.

9. The fuel canister of claim 8, wherein the mechanical valve is normally closed via the pressure of the hydrogen fuel gas, and opened via a biasing or actuation force.

10. The fuel canister of claim 1, wherein the at least one valve of the valve assembly is a check valve to prevent backpressure and atmospheric contamination from entering the refillable hydrogen storage vessel.

11. The fuel canister of claim 1, further comprising an oxidant storage vessel, the oxidant storage vessel being separate from the refillable hydrogen storage vessel.

12. The fuel canister of claim 1, further comprising a regulating device to regulate pressure output from the refillable hydrogen storage vessel.

13. The fuel canister of claim 1, further comprising an induction port for oxidant or air intake located on the fuel canister to promote combustible reaction of the hydrogen fuel gas.

14. The fuel canister of claim 1, further comprising a lubricant port included in the fuel canister, wherein oil is introduced into the lubricant port to diffuse into a flow path and into at least one of the valve assembly or the combustion power tool.

15. A combustion powered fastening tool, comprising:
a tool housing;
a driving system included in the tool housing; and
a fuel delivery system included in the tool housing and configured to deliver fuel to the driving system, wherein the driving system is configured to exert a driving force on a fastener in response to combustion of fuel delivered to the driving system by the fuel delivery system, the fuel delivery system including a fuel canister, the fuel canister including:
a housing including a first end portion and a second end portion;
a refillable hydrogen storage vessel disposed inside of the housing, the refillable hydrogen storage vessel containing metal hydride;
a valve assembly configured to release refillable hydrogen fuel gas, wherein the valve assembly is removable from the refillable hydrogen storage vessel;
an outlet adapter attached to the first end portion to supply the hydrogen fuel gas to the driving system; and
an oxidant storage vessel, the oxidant storage vessel being separate from the refillable hydrogen storage vessel.

16. The tool of claim 15, wherein the fuel canister includes a coupling device, the coupling device including a first coupler attached to the refillable hydrogen storage vessel and a second coupler attached to the valve assembly.

17. A fuel canister for use with a combustion power tool, comprising:
a refillable hydrogen storage vessel containing metal hydride;
a valve assembly including at least one electro-mechanical valve to open or close a valve and to release hydrogen fuel gas, the valve assembly being removably coupled to the refillable hydrogen storage vessel;
a coupling device, the coupling device including a first coupler attached to the refillable hydrogen storage vessel and a second coupler attached to the valve assembly; and
an outlet attached to the valve assembly to supply the hydrogen fuel gas to the combustion power tool.

18. The fuel canister of claim 17, wherein the at least one electro-mechanical valve is operated by a timing control circuit to dispense a metered amount of the hydrogen fuel gas.

19. The fuel canister of claim 17, further comprising:
a housing member having a first end portion and a second end portion; and
an outlet adapter attached to the first end portion of the housing member,
wherein the refillable hydrogen storage vessel and the valve assembly are disposed inside of the housing member.

20. The fuel canister of claim 17, further comprising an oxidant storage vessel, the oxidant storage vessel being separate from the refillable hydrogen storage vessel.

21. The fuel canister of claim 17, further comprising an induction port for oxidant or air intake located on the fuel canister to promote combustible reaction of the hydrogen fuel gas.

22. The fuel canister of claim 17, further comprising a lubricant port included in the fuel canister, wherein oil is introduced into the lubricant port to diffuse into a flow path and into at least one of the valve assembly or the combustion power tool.

23. A fuel canister for use with a combustion power tool, comprising:
a refillable hydrogen storage vessel containing metal hydride;
a valve assembly including at least one valve to release hydrogen fuel gas, the valve assembly being removably coupled to the refillable hydrogen storage vessel;
a coupling device, the coupling device including a first coupler attached to the refillable hydrogen storage vessel and a second coupler attached to the valve assembly;
an induction port for oxidant or air intake located on the fuel canister to promote combustible reaction of the hydrogen fuel gas; and
an outlet attached to the valve assembly to supply the hydrogen fuel gas to the combustion power tool.

24. The fuel canister of claim 23, wherein the at least one valve of the valve assembly is a mechanical valve.

25. The fuel canister of claim 24, wherein the mechanical valve is configured to meter an amount of the hydrogen fuel gas based on volume and pressure of the hydrogen fuel gas.

26. The fuel canister of claim 25, wherein the mechanical valve is normally closed via the pressure of the hydrogen fuel gas, and opened via a biasing or actuation force.

27. The fuel canister of claim 23, wherein the at least one valve of the valve assembly is a check valve to prevent backpressure and atmospheric contamination from entering the refillable hydrogen storage vessel.

28. A combustion powered fastening tool, comprising:
a tool housing;
a driving system included in the tool housing; and
a fuel delivery system included in the tool housing and configured to deliver fuel to the driving system, wherein the driving system is configured to exert a driving force on a fastener in response to combustion of fuel delivered to the driving system by the fuel delivery system, the fuel delivery system including a fuel canister, the fuel canister including:
a housing including a first end portion and a second end portion;
a refillable hydrogen storage vessel disposed inside of the housing, the refillable hydrogen storage vessel containing metal hydride;
a valve assembly configured to release refillable hydrogen fuel gas, the valve assembly being removably coupled to the refillable hydrogen storage vessel;
an induction port for oxidant or air intake located on the fuel canister to promote combustible reaction of the hydrogen fuel gas; and
an outlet adapter attached to the first end portion to supply the hydrogen fuel gas to the driving system.

29. The tool of claim 28, wherein the fuel canister includes a coupling device, the coupling device including a first coupler attached to the refillable hydrogen storage vessel and a second coupler attached to the valve assembly.

* * * * *